(12) United States Patent
Jayachandran

(10) Patent No.: US 12,158,969 B2
(45) Date of Patent: *Dec. 3, 2024

(54) BLOCKCHAIN ENDORSEMENT WITH APPROXIMATE HASH VERIFICATION

(71) Applicant: International Business Machines Corporation, Armonk, NY (US)

(72) Inventor: Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/751,353

(22) Filed: May 23, 2022

(65) Prior Publication Data

US 2022/0292214 A1    Sep. 15, 2022

Related U.S. Application Data

(63) Continuation of application No. 16/424,706, filed on May 29, 2019, now Pat. No. 11,429,738.

(51) Int. Cl.
| | |
|---|---|
| *H04L 9/40* | (2022.01) |
| *G06F 21/62* | (2013.01) |
| *H04L 9/32* | (2006.01) |
| *H04L 9/00* | (2022.01) |

(52) U.S. Cl.
CPC ........ *G06F 21/6227* (2013.01); *H04L 9/3239* (2013.01); *H04L 9/3247* (2013.01); *H04L 9/50* (2022.05)

(58) Field of Classification Search
CPC . G06F 21/6227; H04L 9/3239; H04L 9/3247; H04L 9/50
See application file for complete search history.

(56) References Cited

U.S. PATENT DOCUMENTS

| | | | |
|---|---|---|---|
| 5,990,810 A | 11/1999 | Williams | |
| 6,769,060 B1 | 7/2004 | Dent et al. | |
| 7,363,500 B2 * | 4/2008 | Funk | H04L 63/1466 |
| | | | 713/180 |
| 7,451,325 B2 | 11/2008 | Aaron | |

(Continued)

FOREIGN PATENT DOCUMENTS

WO    2018207064 A1    11/2018

OTHER PUBLICATIONS

List of IBM Patents or Patent Applications Treated as Related, Jun. 22, 2022.

(Continued)

*Primary Examiner* — Ghodrat Jamshidi

(57) ABSTRACT

An example operation may include one or more of transmitting, from a client application, a proposed storage request to a plurality of endorser nodes of a blockchain, receiving a first endorsement of the storage request from a first endorser node, the first endorsement comprising a full-step hash verification of the proposed storage request, receiving a second endorsement of the storage request from a second endorser node, the second endorsement comprising a reduced-step hash verification of the storage request, and transmitting a storage proposal including the full-step hash endorsement and the reduced-step hash endorsement to an ordering node of the blockchain.

20 Claims, 35 Drawing Sheets

(56) References Cited

U.S. PATENT DOCUMENTS

| | | | |
|---|---|---|---|
| 7,921,283 B2 | 4/2011 | Hayes | |
| 8,316,442 B2 | 11/2012 | Prahalad | |
| 8,614,641 B2 | 12/2013 | Yule et al. | |
| 8,914,641 B2 | 12/2014 | Gopal et al. | |
| 9,038,133 B2 | 5/2015 | Chellappa et al. | |
| 9,396,243 B1* | 7/2016 | Halevi | G06F 3/0641 |
| 10,678,654 B2 | 6/2020 | Pogosyan et al. | |
| 10,719,373 B1* | 7/2020 | Koponen | G06F 9/54 |
| 10,756,904 B1 | 8/2020 | Perlman et al. | |
| 11,038,857 B1* | 6/2021 | Paczkowski | H04W 4/14 |
| 11,140,077 B2 | 10/2021 | Munson et al. | |
| 11,151,276 B1 | 10/2021 | Wang et al. | |
| 11,164,115 B1 | 11/2021 | Todd et al. | |
| 11,297,500 B2 | 4/2022 | Jain | |
| 11,308,036 B2 | 4/2022 | Gonczi et al. | |
| 11,386,217 B2 | 7/2022 | Greven | |
| 11,711,202 B2 | 7/2023 | Jayachandran | |
| 2004/0111610 A1 | 6/2004 | Slick et al. | |
| 2006/0075246 A1 | 4/2006 | Suga | |
| 2007/0162894 A1 | 7/2007 | Noller et al. | |
| 2009/0089584 A1 | 4/2009 | Bender et al. | |
| 2009/0254754 A1* | 10/2009 | Bellur | H04L 9/3247 |
| | | | 713/176 |
| 2010/0318989 A1* | 12/2010 | Dureau | H04L 67/02 |
| | | | 707/769 |
| 2011/0066628 A1 | 3/2011 | Jayaraman | |
| 2012/0233693 A1 | 9/2012 | Stites et al. | |
| 2013/0246378 A1 | 9/2013 | Hearnden et al. | |
| 2014/0075180 A1* | 3/2014 | Farrugia | G06F 21/10 |
| | | | 713/150 |
| 2014/0164775 A1 | 6/2014 | Wu et al. | |
| 2016/0099810 A1 | 9/2016 | Li et al. | |
| 2016/0379212 A1 | 12/2016 | Bowman et al. | |
| 2017/0255765 A1* | 9/2017 | Anderson | G06F 21/33 |
| 2017/0286233 A1 | 10/2017 | Dain et al. | |
| 2017/0300877 A1 | 10/2017 | Mann et al. | |
| 2018/0006807 A1* | 1/2018 | Suresh | H04L 9/0618 |
| 2018/0095941 A1 | 4/2018 | Ciabarra, Jr. et al. | |
| 2018/0097779 A1 | 4/2018 | Karame et al. | |
| 2018/0097842 A1 | 4/2018 | Roskind et al. | |
| 2018/0109516 A1 | 4/2018 | Song et al. | |
| 2018/0157839 A1* | 6/2018 | Pearson | G06F 21/602 |
| 2018/0174037 A1 | 6/2018 | Henry | |
| 2019/0147190 A1 | 5/2019 | Marin | |
| 2019/0228386 A1 | 7/2019 | Onnainty | |
| 2019/0279241 A1* | 9/2019 | DiTomaso | G06F 16/27 |
| 2019/0394023 A1* | 12/2019 | Menon | H04L 9/3239 |
| 2020/0005282 A1 | 1/2020 | Kim | |
| 2020/0027093 A1* | 1/2020 | Volk | G06Q 30/016 |
| 2020/0034039 A1* | 1/2020 | Jiang | G06F 11/0754 |
| 2020/0143469 A1 | 5/2020 | Stewart et al. | |
| 2020/0167339 A1* | 5/2020 | Manevich | H04L 9/0643 |
| 2020/0174679 A1* | 6/2020 | Scott | G06F 3/0673 |
| 2020/0204349 A1 | 6/2020 | Sardesai et al. | |
| 2020/0252202 A1 | 8/2020 | Madl et al. | |
| 2020/0278963 A1 | 9/2020 | Destefanis et al. | |
| 2020/0327098 A1 | 10/2020 | Gonczi et al. | |
| 2020/0358612 A1 | 11/2020 | Vigneron et al. | |
| 2020/0358619 A1 | 11/2020 | Ding et al. | |
| 2020/0364205 A1* | 11/2020 | Novotny | H04L 9/3239 |
| 2020/0379856 A1 | 12/2020 | Jayachandran | |
| 2020/0380154 A1 | 12/2020 | Jayachandran | |
| 2020/0382279 A1 | 12/2020 | Jayachandran | |
| 2020/0382280 A1 | 12/2020 | Jayachandran | |
| 2020/0382309 A1 | 12/2020 | Jayachandran | |
| 2020/0382310 A1 | 12/2020 | Jayachandran | |
| 2020/0412549 A1 | 12/2020 | Endo | |
| 2021/0201328 A1 | 7/2021 | Gunther | |
| 2021/0243007 A1 | 8/2021 | Kramer et al. | |
| 2021/0377041 A1 | 12/2021 | Covaci et al. | |
| 2022/0147961 A1 | 5/2022 | Yoon et al. | |
| 2022/0164791 A1 | 5/2022 | Yoon et al. | |

OTHER PUBLICATIONS

Praveen Jayachandran, "Peer Node Recovery via Approximate Hash Verification", U.S. Appl. No. 16/424,612, filed May 29, 2019 (a copy is not provided as this application is available to the Examiner).

Praveen Jayachandran, "Reduced-Step Blockchain Verification of Media File", U.S. Appl. No. 16/424,671, filed May 29, 2019 (a copy is not provided as this application is available to the Examiner).

Praveen Jayachandran, "Blockchain Endorsement With Approximate Hash Verification", U.S. Appl. No. 16/424,706, filed May 29, 2019 (a copy is not provided as this application is available to the Examiner).

Praveen Jayachandran, "Committing Data to Blockchain Based on Approximate Hash Verification", U.S. Appl. No. 16/424,765, filed May 29, 2019 (a copy is not provided as this application is available to the Examiner).

Praveen Jayachandran, "Approximate Hash Verification for Blockchain", U.S. Appl. No. 16/424,588, filed May 29, 2019 (a copy is not provided as this application is available to the Examiner).

Dryja, Utreexo: a dynamic hash-based accumulator optimized for the Bitcoin UTXO set, Cryptology ePrint Archive, 2019.

Luo et al., Fast Scalable Supervised Hashing. Proceedings SIGIR' 18, Jul. 8-12, 2018, Ann Arbor, MI, USA, pp. 735-744 (Year: 2018).

Carraher, "Approximate Clustering Algorithms for High Dimensional Streaming and Distributed Data", Diss. University of Cincinnati, 2018.

Kruber et al., "Approximate hash-based set reconciliation for distributed replica repair." Reliable Distributed Systems (SRDS), 2015 IEEE 34th Symposium on. IEEE, 2015.

Lai et al. "Simultaneous feature learning and hash coding with deep neural networks." Proceedings of the IEEE conference on computer vision and pattern recognition. 2015.

Sethumadhavan et al. "Scalable hardware memory disambiguation for high ILP processors." Proceedings of the 36th annual IEEE/ACM International Symposium on Microarchitecture. IEEE Computer Society, 2003.

Xia et al. "Supervised hashing for image retrieval via image representation learning." AAAI. vol. 1. No. 2014. 2014.

Yang et al., "Supervised learning of semantics-preserving hash via deep convolutional neural networks." IEEE transactions on pattern analysis and machine intelligence 40.2 (2018): 437-451.

* cited by examiner

420 FIG. 4D
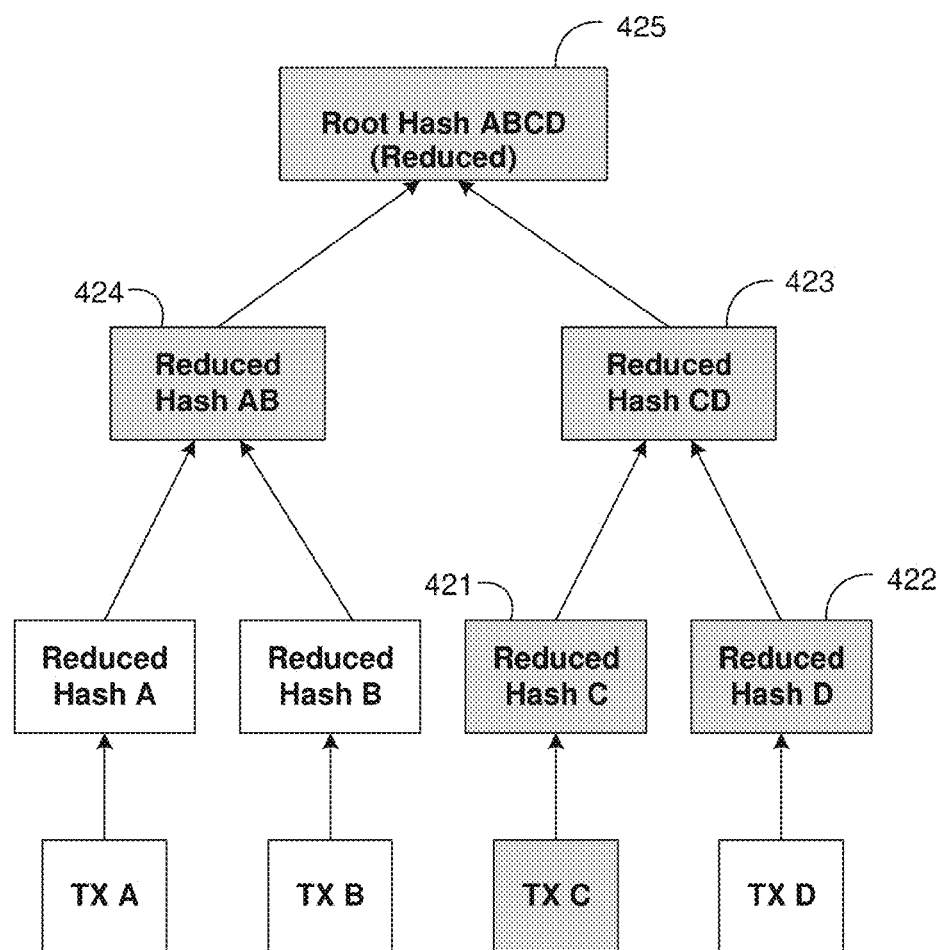
 = Denotes a Reduced Hash Needed to Verify Transaction C

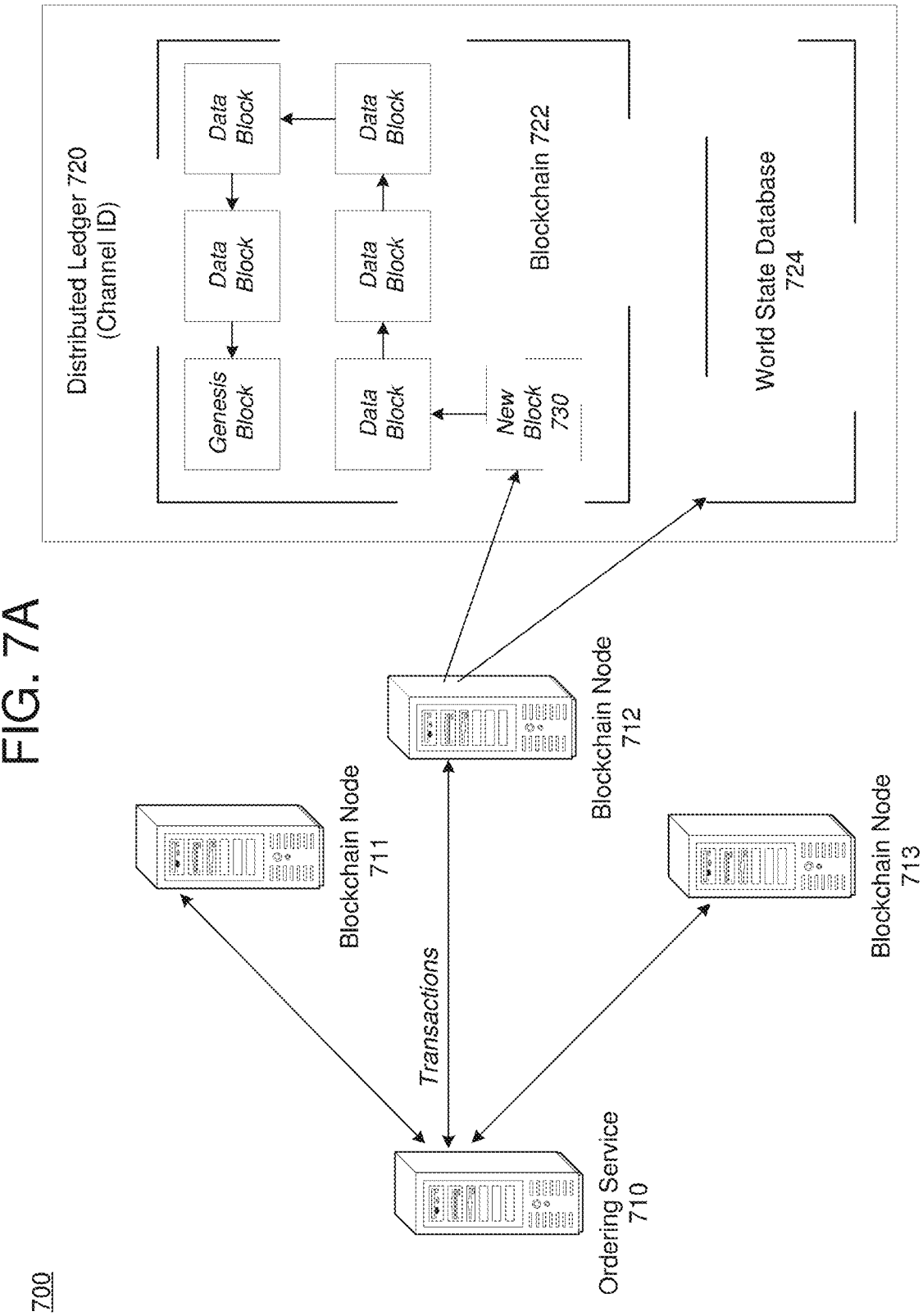

BLOCKCHAIN ENDORSEMENT WITH APPROXIMATE HASH VERIFICATION

TECHNICAL FIELD

This application generally relates to processes of a blockchain, and more particularly, to a blockchain which integrates an approximate hash verification and thereby reduces the amount of computation needed for verification within a blockchain network.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Blockchain storage resolves some of the deficiencies of traditional storage systems. One of the benefits of blockchain is that it is decentralized and thus highly fault-tolerant meaning that the blockchain can continue to operate properly even when one or some of the components have failed. Additional benefits supported by blockchain include an immutable record, lack of a central authority, security, smart contracts, and the like, which are not commonly found in traditional databases. In order to enforce these properties, blockchain systems rely on hashes to secure data that is transmitted among the parties and stored on the blockchain. However, a typical blockchain hash can consume significant resources. As such, what is needed is an improved mechanism for securing data within the blockchain.

SUMMARY

One example embodiment provides a system that includes one or more of a network interface configured to transmit, from a client application, a proposed storage request to a plurality of endorser nodes of a blockchain, and a processor configured to one or more of receive, via the network interface, a first endorsement of the storage request from a first endorser node, where the first endorsement comprises a full-step hash verification of the proposed storage request, receive a second endorsement of the storage request from a second endorser node, where the second endorsement comprises a reduced-step hash verification of the storage request, and control the network interface to transmit a storage proposal that includes the full-step hash endorsement and the reduced-step hash endorsement to an orderer node of the blockchain.

Another example embodiment provides a method that includes one or more of transmitting, from a client application, a proposed storage request to a plurality of endorser nodes of a blockchain, receiving a first endorsement of the storage request from a first endorser node, the first endorsement comprising a full-step hash verification of the proposed storage request, receiving a second endorsement of the storage request from a second endorser node, the second endorsement comprising a reduced-step hash verification of the storage request, and transmitting a storage proposal including the full-step hash endorsement and the reduced-step hash endorsement to an ordering node of the blockchain.

A further example embodiment provides a non-transitory computer readable medium comprising instructions, that when read by a processor, cause the processor to perform one or more of transmitting, from a client application, a proposed storage request to a plurality of endorser nodes of a blockchain, receiving a first endorsement of the storage request from a first endorser node, the first endorsement comprising a full-step hash verification of the proposed storage request, receiving a second endorsement of the storage request from a second endorser node, the second endorsement comprising a reduced-step hash verification of the storage request, and transmitting a storage proposal including the full-step hash endorsement and the reduced-step hash endorsement to an ordering node of the blockchain.

Another example embodiment provides a system that includes one or more of a network interface configured to receive, from a client application, a storage request that comprises a full-step hash of a data value signed by the client application and a reduced-step hash of the data value signed by the client application, and a processor configured to one or more of determine whether to verify the full-step hash of the storage request or the reduced-step hash of the storage request, and in response to a determination to verify the reduced-step hash of the storage request, generate an approximate hash verification for the reduced-step hash of the data value, wherein the processor further controls the network interface to transmit an endorsement response which includes the generated approximate hash verification.

Another example embodiment provides a method that includes one or more of receiving, from a client application, a storage request that comprises a full-step hash of a data value signed by the client application and a reduced-step hash of the data value signed by the client application, determining whether to verify the full-step hash of the storage request or the reduced-step hash of the storage request, in response to a determination to verify the reduced-step hash of the storage request, generating an approximate hash verification for the reduced-step hash of the data value, and transmitting an endorsement response to the client application which includes the generated approximate hash verification.

BRIEF DESCRIPTION OF THE DRAWINGS

FIG. 4D is a diagram illustrating a process of verifying an unspent transaction via an approximate hash verification, according to example embodiments.

FIG. 7A is a diagram illustrating a process of a new block being added to a distributed ledger, according to example embodiments.

DETAILED DESCRIPTION

Figure 1:
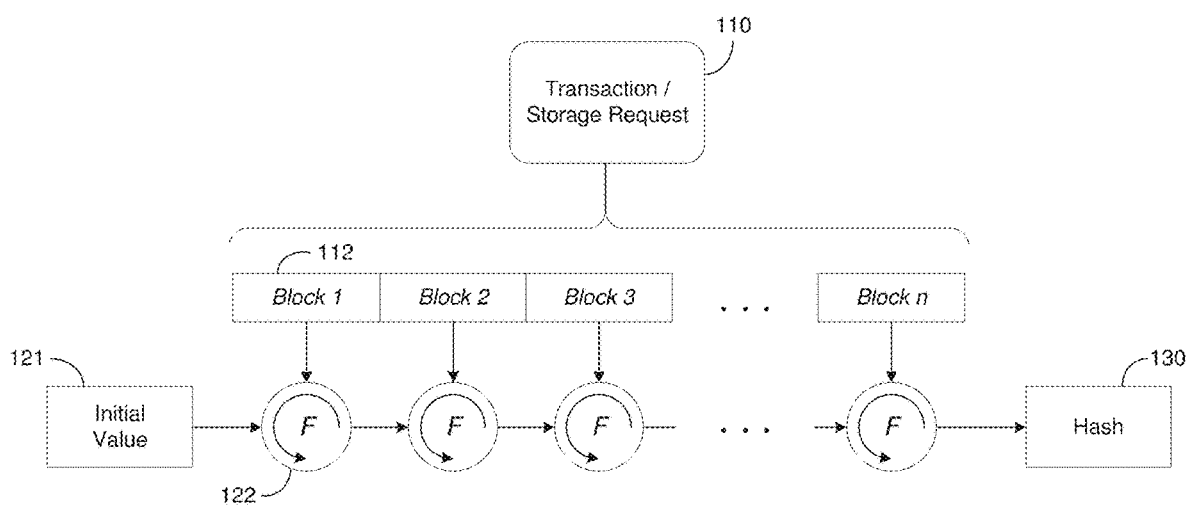
FIG. 1 is a diagram illustrating a hash process for generating a full-step hash and a reduced-step hash according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide an approximate hash verification for blockchain.

In one embodiment the system utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This system can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This system can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This system can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This system can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Cryptographic hashing is a basic building block that is used extensively in blockchain systems. For example, a block hash (hash of a current block) is included in a next block. As another example, transactions are hashed and stored on a data structure (e.g., a Merkle tree) within a block. As another example, digital signatures involve signing a hash of the message with private key, which in turn is used extensively in all communication, endorsements, client transaction submissions, and the like. As another example, document hashes may be stored as part of smart contract state, and verified upon retrieval. As another example, a blockchain fabric may store actual data within an off-chain data storage (side storage) while keeping a hash of the data within a public blockchain.

Blockchain is built to be extremely fault tolerant. For example, data and smart contract computation is replicated, with multiple nodes verifying transactions. In addition, all digital signatures for messages are verified by multiple nodes. As another example, transaction and block hashes are checked by all peer nodes. An endorsement policy can be used to ensure that sufficiently many nodes agree on client's authorization and correctness of transaction. Because of the fault-tolerance supported by blockchain, even if some nodes fail, the correct nodes will continue to ensure the system is working correctly.

The example embodiments introduce the concept of approximate hash verification to blockchain. When a hash of a data item (transaction, message, file, etc.), the creator may generate a full-step hash and a reduced-step hash of the data item. Here, the reduced-step hash may be the same hash function being applied as the full-step hash, but may be applied for fewer steps than the full-step hash. As a non-limiting example, the full-step hash may be applied for 64 steps while a reduced-step hash may be applied for only 48 steps. Therefore, a verifying entity may choose whether to verify the full-step hash (for full verification) or the reduced-step hash (for approximate verification). This decision may be random, dictated by policy, predetermined, periodic, or the like. The approximate verification can save significant computation for the node involved.

A potential setback of the approximate verification is a very slight increase in the chance that an incorrect result/calculation may be generated in comparison to the full-hash verification. However, because of the fault-tolerant properties of the blockchain, any mistakes (although very rare) may be corrected by other nodes on the blockchain that do not perform the approximate verification.

Hashing in blockchain refers to the process of having an input item of whatever length reflecting an output item of a fixed length. As one example, transactions of varying lengths may be run through a given hashing algorithm which generates an output that is of a fixed length. That is, the output is the same length regardless of the length of the input transaction. The output is referred to as a hash. A common hashing algorithm used on blockchain is Secure Hashing Algorithm 256 (commonly shortened to SHA-256), however, many others are possible such as MD5 (message digest algorithm), and the like. In SHA-256, hashing gives an output result of a fixed length (i.e., 256-bits length or 32 bytes). This is always the case whether the transaction is just a single word or a complex transaction with huge amounts of data. What this means is that keeping track of a transaction becomes easier when you can recall/trace the hash. The size of the hash will depend on the hash function utilized, but the out using a particular hashing algorithm will be of a specific size.

For a cryptographic hash function to be considered secure, it has to portray certain characteristics or properties. For example, the hash function may have a fixed or specific output (deterministic). It doesn't matter what number of times a given input is processed using a hash function; the result should always of the same length. The hashes will be random and of different patterns, but the same size/length. As another example, the hash function may be one that performs quick computations for every data input. It may be difficult to find the input data for a hash, but computing or calculating the hash should ideally be very fast. As another example, the hash function may be one-way (pre-image resistant). Here, given a hash of a particular transaction, it should be virtually impossible or practically infeasible to determine the original input data using this output. As another example, the hash function may be randomized in that the hash function produces different outputs for every input, even if the input data differs by only a digit or letter. As another example, the hash function may be collision-resistant in that different inputs do not create a same or similar output. The examples herein may refer to SHA-256, MD5, or the like, but these should not be construed as limiting the types of hash functions that can be used by the system herein.

Some benefits of the instant solutions described and depicted herein include reduced computational effort by one or more nodes within a blockchain while still maintaining the overall correctness and security of the blockchain. Furthermore, the speed at which a reduced-step hash and corresponding approximate hash verification are significantly faster than a full-step hash and a full-step hash verification. The approximate hash verification may be performed by some, but not all nodes, within a blockchain system. Therefore, the full-hash verification can be used to confirm and correct any mistakes, although rare. Furthermore, the reduced-step hash can be created without any additional computation because the same hash function may be used. Therefore, the reduced-step hash may be generated while generating the full-step hash. For example, the reduced-step hash may be created by applying a hash function for 48 steps while the full-step hash may be created by applying the hash function for another 16 steps (64 steps total), but embodiments are not limited thereto.

According to various aspects, even if a node applies approximate hash verification and the hash verification is incorrect, there is sufficient fault tolerance in the blockchain system to counter the incorrectness. It is similar to when a peer fails or acts maliciously, which will not affect the system's correctness. Furthermore, approximate hash verification permits improved performance of the system (e.g., less processor computation on hash verification and more processor computation on other blockchain processes). Furthermore, the proposed technique can be applied to any system and instance of hash verification for which the system has in-built fault tolerance (for both the individual peer and the overall system). In addition, the blockchain platform may stipulate how many full nodes (non-approximating) must be present to ensure robustness/fault tolerance.

In the examples herein, the node performing the approximate hash verification may be incorrect. In this case, the blockchain continues to function correctly because the platform can stipulate a minimum number of peers that must perform full-step hash verification. In this case, the other peers (full-step hash verifiers) would detect the verification correctly. The faulty peer can now check the blockchain state (after consensus with other nodes) and detect that it had made an error in admitting/refusing that transaction, when in fact other nodes came to a different conclusion.

FIG. 1 illustrates a hash process 100 for generating a full-step hash and a reduced-step hash according to example embodiments. Referring to FIG. 1, a message 110 is converted into a cryptographic hash 130. Many popular hash functions include the following: (i) a particular non-linear function is chosen, (ii) the selected non-linear function is applied repeatedly on the input for several steps or rounds, and (iii) after repeating this for several steps (say 64 steps), the output will look very different from the original input such that even a small difference in the original input would be magnified by the repeated application of the non-linear function, to produce a very different output (hashes of two similar looking messages will be very different). The reason to repeat the hash function for a large number of rounds is to prevent security attacks. Security properties of the popular hash functions when run for fewer number of steps have been widely studied.

As shown in FIG. 1, the message 110 (transaction, data item, etc.) is broken up into a plurality of smaller blocks 112. In this model, the message 110 may be padded and divided into blocks 112 of uniform length. The blocks 112 are then processed sequentially with a hash function F (compression function) 122. For example, the system may create an input whose size is a multiple of a fixed number (e.g. 512 or 1024) because compression functions cannot handle inputs of arbitrary size. The hash function then breaks the result into blocks of fixed size 112, and processes them one at a time with the compression function 122, each time combining a block of the input with the output of the previous round.

In order to make the construction secure, messages may be padded with a padding that encodes the length of the original message. This is called length padding or Merkle-Damgard strengthening. Starting with an initial block, hash function 122 repeatedly generates a new intermediate hash value from the previous one and a new message block. The output of the final compression function is the hash 130 of the message.

In FIG. 1, the one-way compression function is denoted by F 122, and transforms two fixed length inputs to an output of the same size as one of the inputs. The algorithm starts with an initial value 121, also referred to as an initialization vector (IV). The initial value 121 is a fixed value (algorithm or implementation specific). For each block 112, the compression (or compacting) function F 122 takes the result so far, combines it with the message block, and produces an intermediate result. The last block is padded with zeros as needed and bits representing the length of the entire message are appended.

To create the full-step hash, the function F 122 may be applied a first number of times, for example, 64 rounds, etc. Meanwhile, to create the reduced-step hash, the function F 122 may be applied a second number of times that is less than the first number of times, for example, 48 rounds, etc. When an entity creating the hash (such as the client, etc.) provides the hash to the blockchain nodes, etc., the entity should provide not only the full-step hash but also the reduced-step hash. That is, the example embodiments include an entity providing an original hash function algorithm (e.g., 64 rounds, etc.), but also an intermediate result from a reduced-step application (e.g., 48 rounds, etc.) of the same algorithm. The computation effort for anyone else to verify the reduced-step hash function would be lesser than the effort for the original function.

Figure 2A:
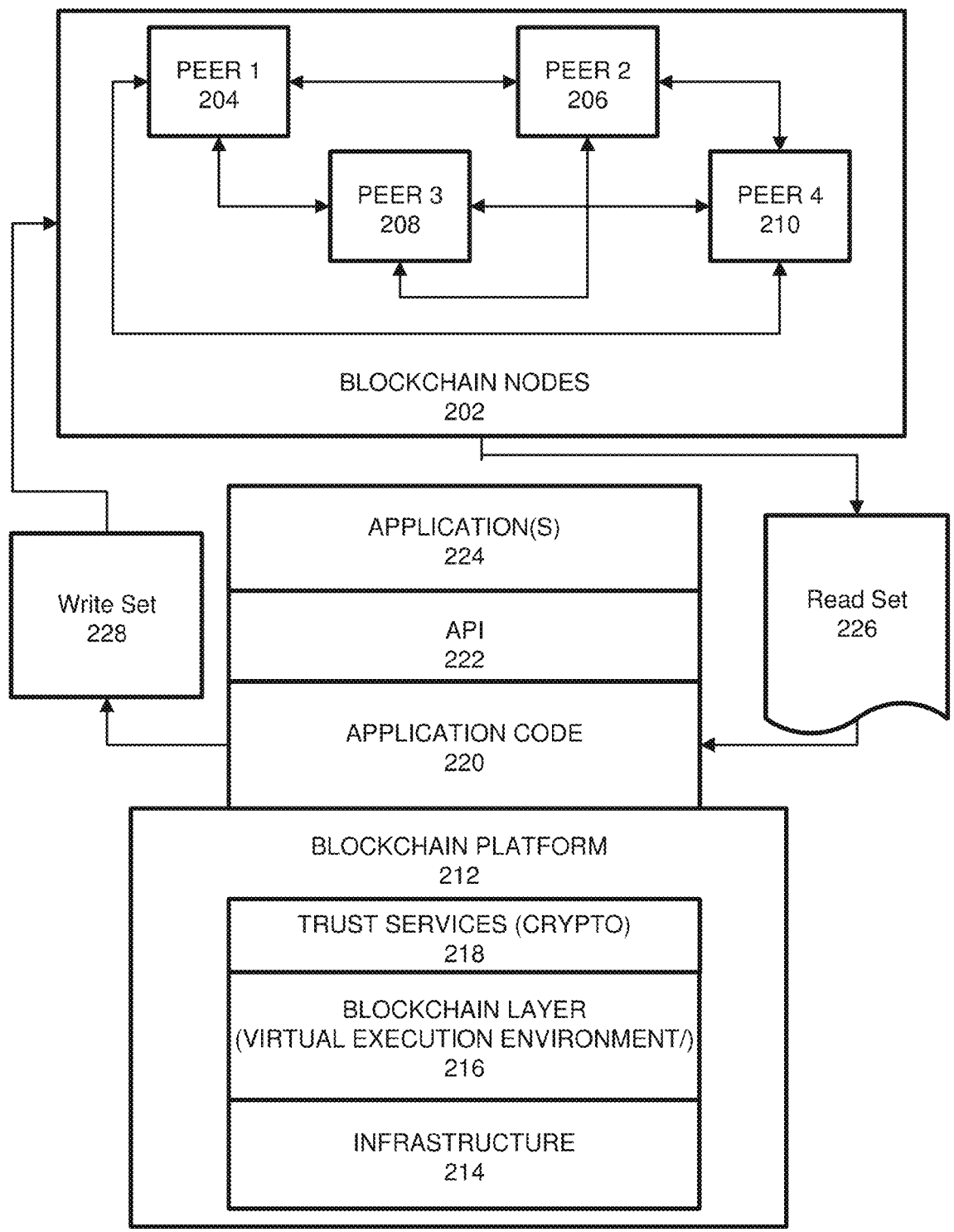
FIG. 2A is a diagram illustrating an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, a read set 226 may be processed by one or more processing entities (e.g., virtual machines) included in the blockchain layer 216. The result may include a write set 228 for storage on the blockchain ledger. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
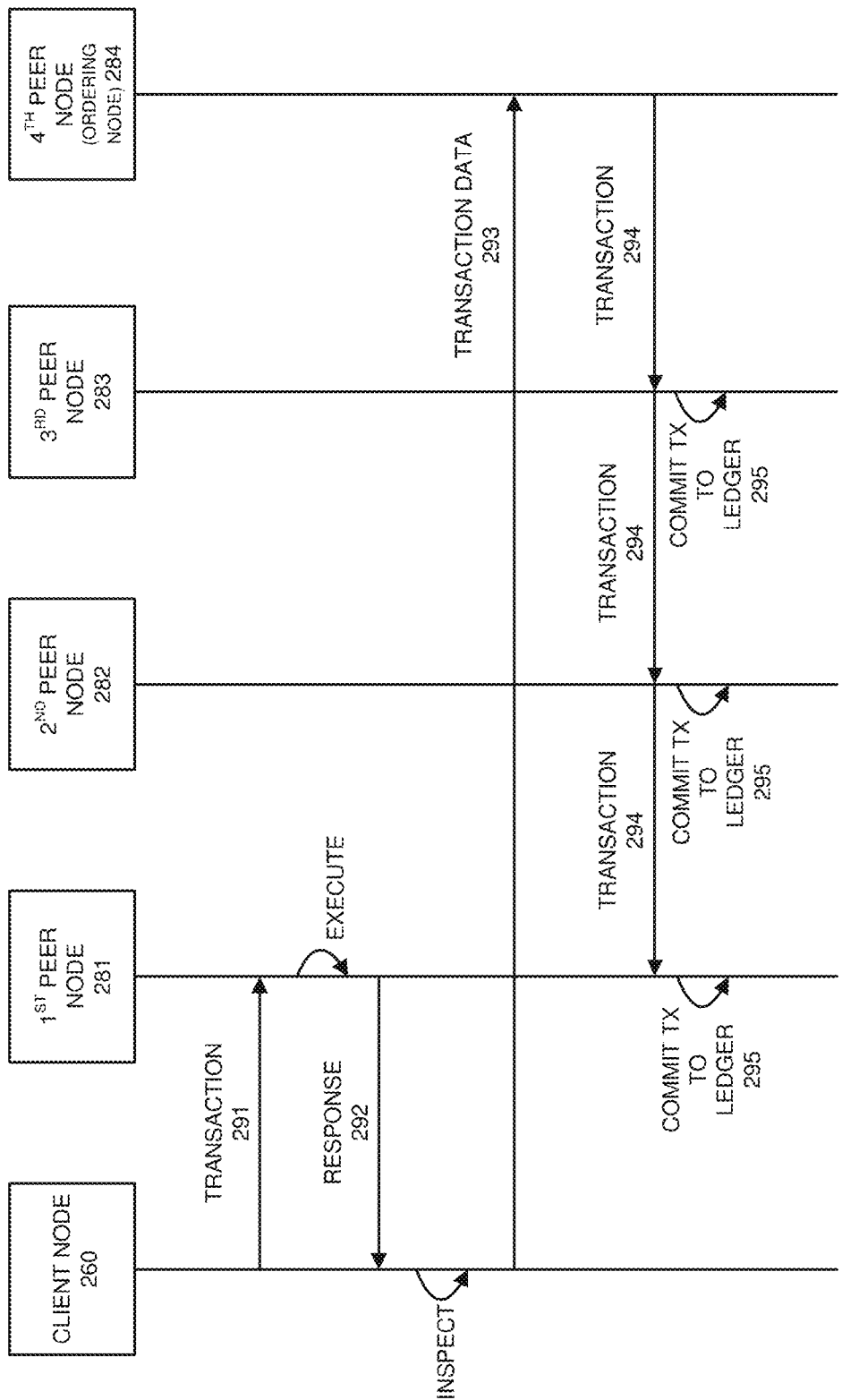
FIG. 2B is a diagram illustrating a blockchain transactional flow among nodes, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
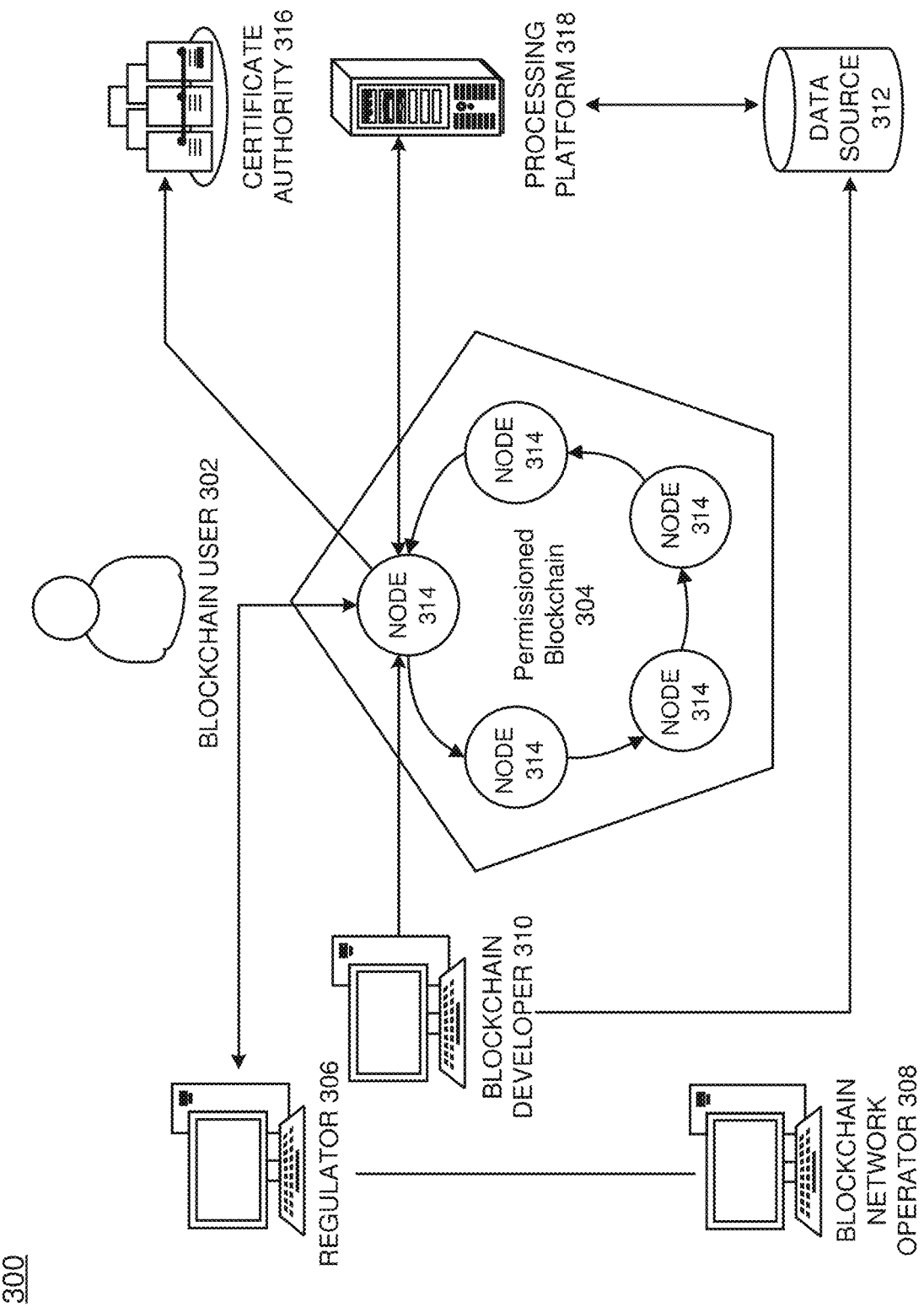
FIG. 3A is a diagram illustrating a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
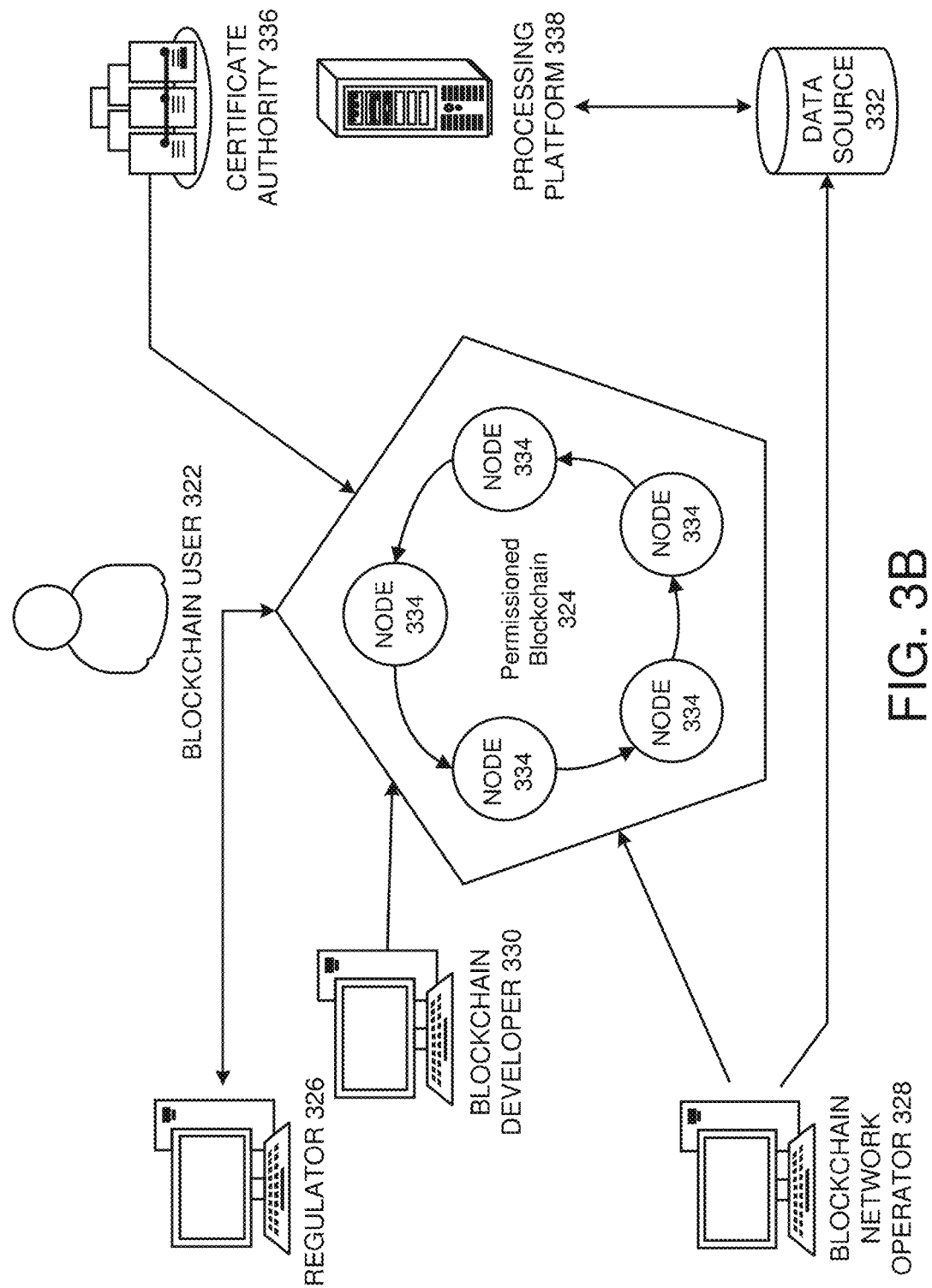
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
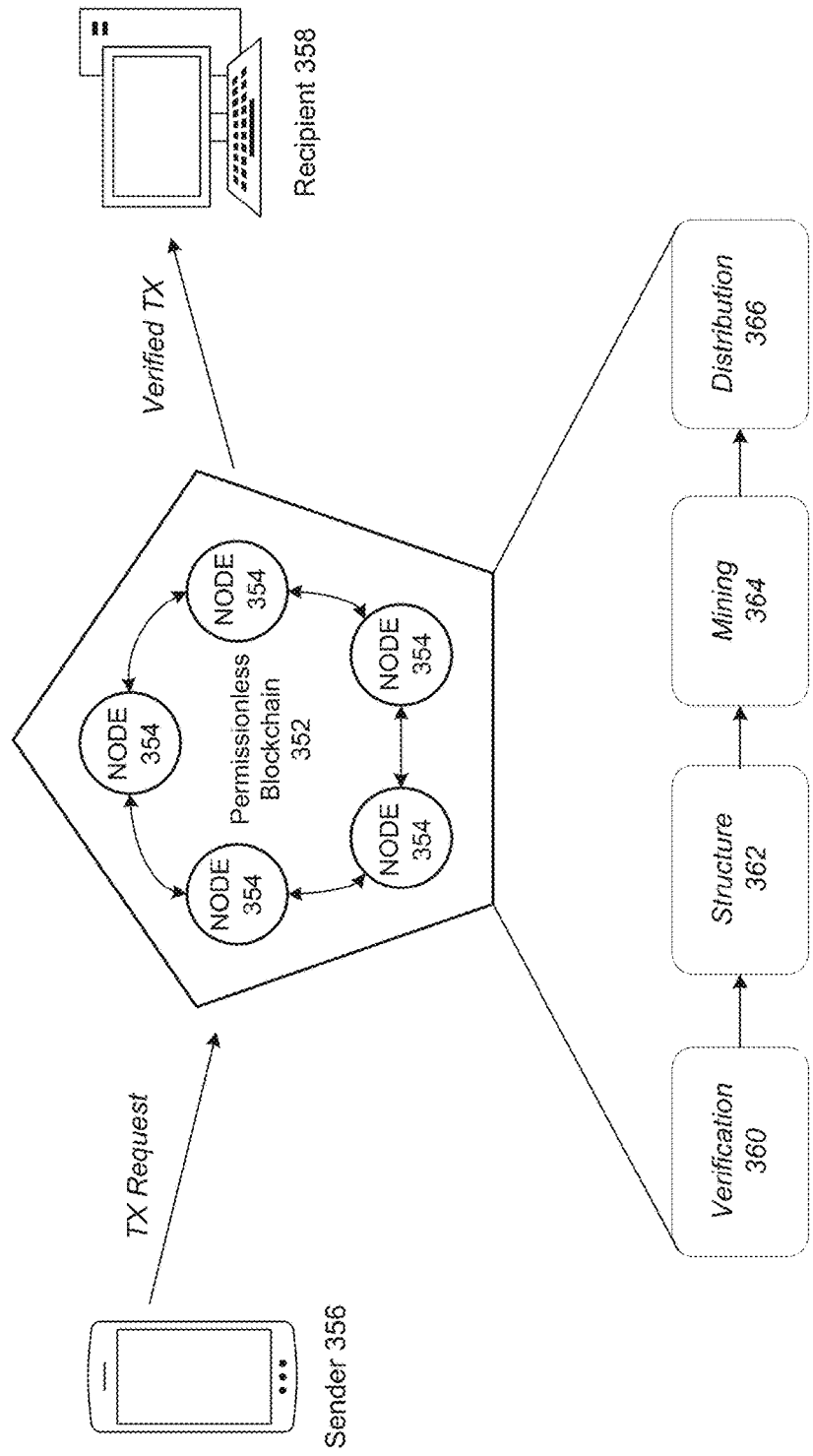
FIG. 3C is a diagram illustrating a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

In the examples of FIGS. 4A-4G, various examples are provided in which an approximate hash verification can be performed instead of or along with a full-step hash verification. The approximate hash verification only computes a reduced-step hash operation and does not execute all of the steps of the full-step hash operation. Therefore, the approximate hash verification is faster and consumes less resources. In order to enable the approximate hash verification, a client, node, etc., submitting the hashed data may submit both the full-step hash of the data and the reduced-step hash of the data. The reduced-step hash is generated using the same function as the full-step hash, but is performed less times/rounds. Therefore, there is no additional computation needed for the client, node, etc. to submit both the reduced-step hash and the full-step hash.

Hashing is used in many places in any blockchain protocol (e.g., digital signatures for all communication include hashes, hash of each block of transactions is stored in the header of the next block, hash of smart contract state is used to verify consistency of the ledger across different nodes, the application can use a hash to verify that the data it recorded on the blockchain has not been tampered with, etc.) Wherever a hash is stored, the example embodiments may store a reduced-step hash instead of or in addition to the full-step hash. This would permit any verifier to either verify the full hash function output or the reduced-step hash function output.

Figure 4A:
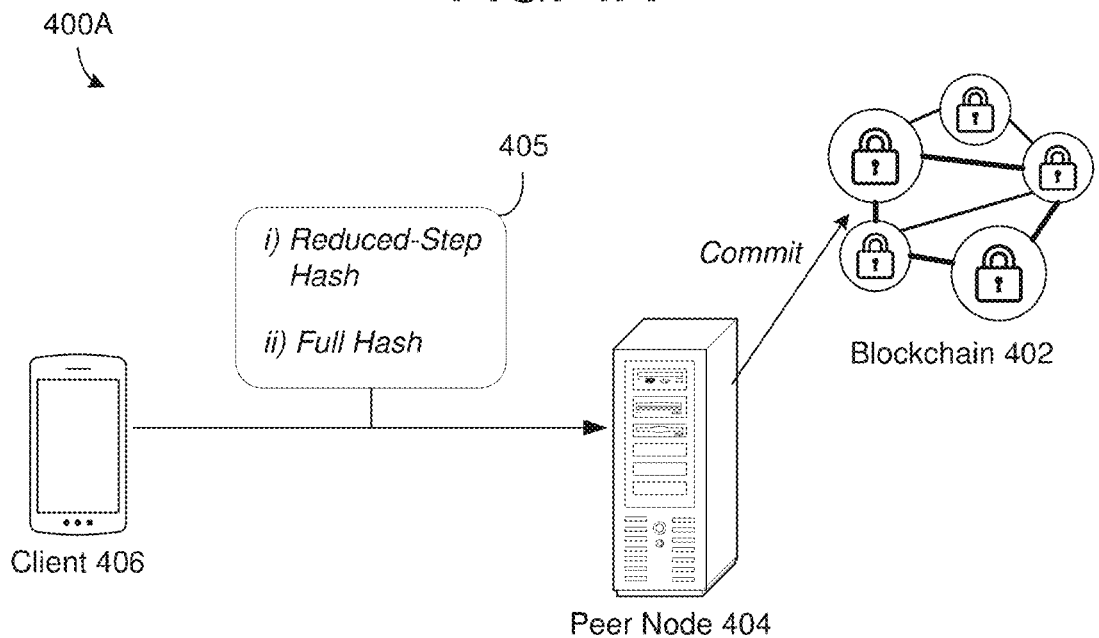
FIGS. 4A-4B are diagrams illustrating a process of storing data and performing an approximate hash verification of the stored data according to example embodiments.
Figure 4B:
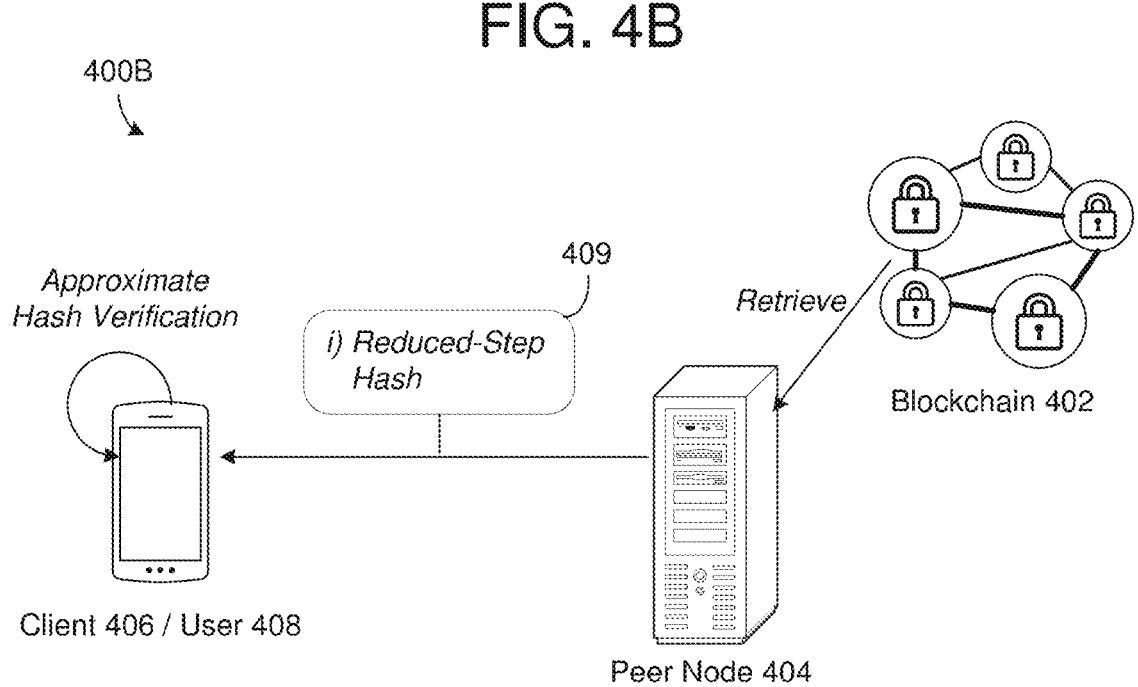

FIGS. 4A-4B illustrate a process of storing data and performing an approximate hash verification of the stored data according to example embodiments. In the example of FIG. 4A, during a process 400A, a client 406 submits a transaction 405 to a blockchain 402 via a blockchain peer node 404. Here, the client 406 hashes the transaction 405 prior to submitting it to the peer node 404. In this example, the client 406 submits both a reduced-step hash of the transaction 405 and a full-step hash of the transaction 405. In this example, the transaction 405 may include any desired transaction for storage on the blockchain 402. The transaction (also referred to herein as a blockchain entry, storage request, etc.) may be between more than one party or may be associated with a single party.

Referring to FIG. 4B, a node e.g., the client node 406 or another node 408, wants to verify that the transaction 405 has been recorded correctly on the blockchain 402. For example, the submitting client 406 may desire to verify that the outputs of the transaction have been registered correctly (e.g., perform a transaction to transfer 10 tokens of currency, etc.) Here the client 406 may verify that a balance has been correctly deducted by 10 tokens, etc. More generically, any client application or blockchain node that submitted a transaction to be included in the blockchain, can check the hash of the transaction in the block added to the chain to ensure that it has been added correctly.

In the processor 400B of FIG. 4B, the peer node 404 retrieves the reduced-step hash 409 of the transaction. In this case, the client 406 may perform an approximate hash verification based on the reduced-step hash 409 instead of the full-step hash. Here, to perform the approximate hash verification, the client 406 may generate a local copy of the reduced-step hash of the transaction and compare it with the retrieved reduced-step hash 409 stored on the blockchain 402. If the locally generated reduced-step hash matches the retrieved reduced-step hash 409, the client 406 can verify that the transaction was recorded correctly.

Figure 4C:
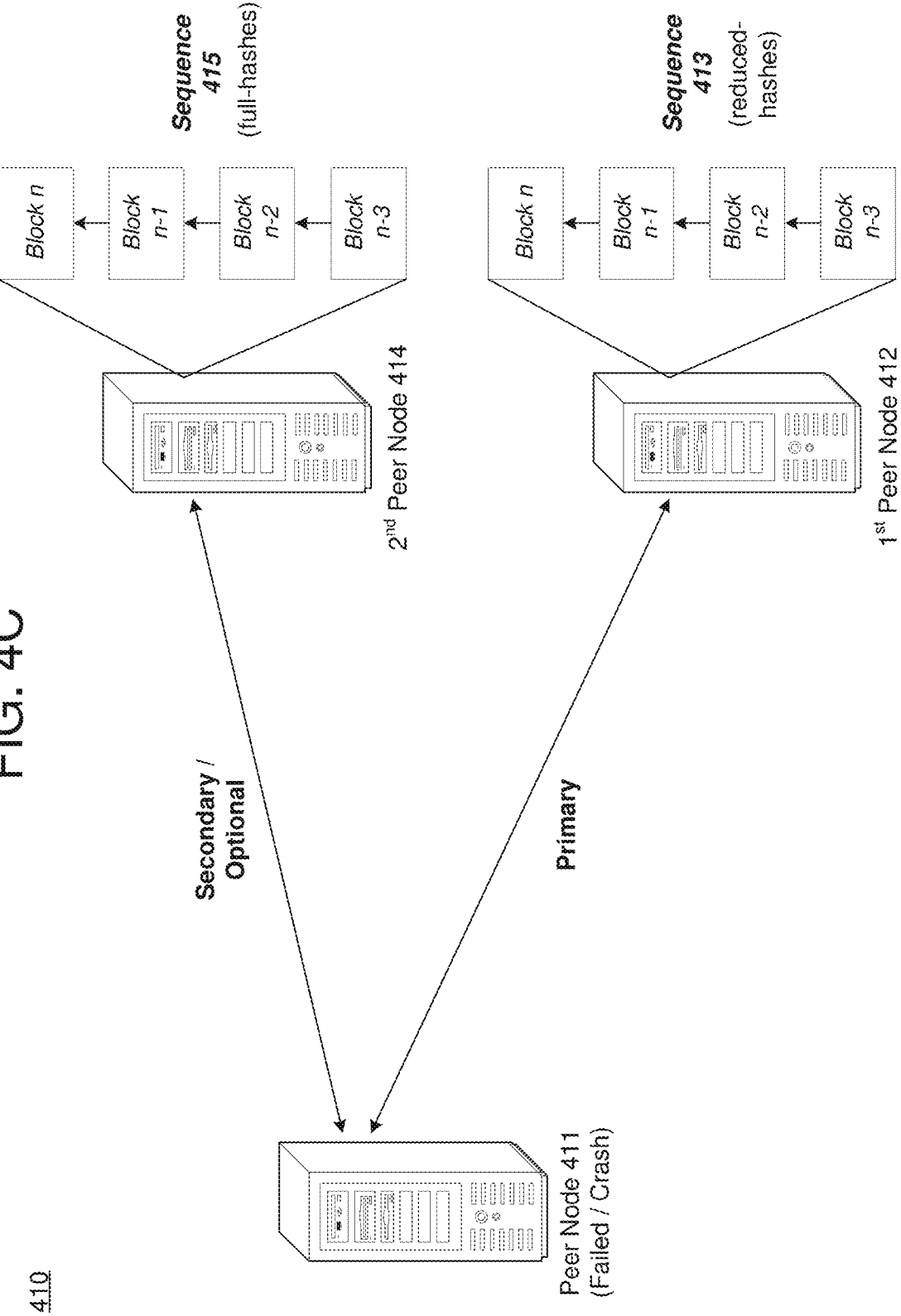
FIG. 4C is a diagram illustrating a blockchain node performing a recovery operation via an approximate hash verification, according to example embodiments.

FIG. 4C illustrates a process 410 of a blockchain node 411 performing a recovery operation via an approximate hash verification, according to example embodiments. Referring to FIG. 4C, the blockchain node 411 may be a peer node, an endorser node, an ordering node, a combination thereof, or the like. In this example, the blockchain node 411 has detected an interruption that has occurred in the storage of block data within a local copy of the distributed ledger managed by the blockchain node 411. Reasons for interruption include power outage/failure, corrupt data, malware/attack, and the like. In this example, the blockchain node 411 may request recovery of the missed/corrupted data from one or more other peer nodes such as peer nodes 412 and peer nodes 414 which also store a local copy of the distributed ledger.

In this example, the blockchain node 411 may recover the missed blocks from a first peer node 412. In this example, the first peer node 412 may store a sequence of blocks 413 which are linked together through reduced-step hashes instead of full-step hashes. In this case, a header or other content of a block may be hashed (via the reduced-step hash) and stored in a next block to create a link between the blocks. When the blockchain node 411 receives the sequence 413 it may perform an approximate hash verification and compare the hash of each transaction stored in the blocks and also the way it has been chained together (with the hash of a block being present in the next block and so on) to verify that the blocks have not been tampered with. Comparing these hashes provides a guarantee to the recovering peer 411 that the data it has received is the correct blockchain data and has not been tampered by the peer it contacted to acquire the data.

As an optional process, the blockchain node 411 may retrieve a sequence of blocks 415 from a second peer 414 which have been hashed and linked together using a full-step hash. In this case, the sequence of blocks 415 may be the same block content as the sequence of blocks 413 with full-step hashes being performed instead of reduced-step hashes. In response, the blockchain node 411 can verify that the hash of each block is included in the next block using approximate hash verification, and also verify that the hash of the blocks is as provided by the second peer 414 (optionally).

FIG. 4D illustrates a process 420 of verifying an unspent transaction via an approximate hash verification, according to example embodiments. Various blockchain platforms employ an unspent transaction output model (UTXO), such as Bitcoin, Ethereum and Corda, for checking and preventing double spending. Here each peer node creates a Merkle tree of hashes of transactions and stores the Merkle roots of each block. Every node also maintains a list of unspent transaction outputs (outputs that are not the inputs for any other transaction).

Referring to FIG. 4D, a client, when submitting a transaction, needs to prove that their inputs are not yet spent. To do this, the client may prove the transaction is unspent by providing a valid path in the Merkle tree of a block that contains the input. Each peer by computing the Merkle root from the hashes provided, can verify that the UTXO hasn't been spent yet. In the example of FIG. 4D, the transaction C is unspent. To verify this, the client may provide a path of reduced-step hashes including a reduced-step hash 421, a reduced-step hash 422, a reduced-step hash 423, a reduced-step hash 424, and a root hash 425. Here, the root hash 425 includes a concatenation of the path of reduced-step hashes 424, 423, 422, and 421. In this case, the peer may compute the hash of all the entries in the Merkle path along with the referenced transaction from the first hash 421 to the root hash 424 and check whether the result is indeed the Merkle root of the referenced block (this proves that the referenced transaction is indeed a transaction on the blockchain).

In this example, each peer in the blockchain creates a Merkle tree of hashes of all transactions for each block. Furthermore, the Merkle root of the tree for each block is maintained as an identifier of the block. Each peer also maintains the list of UTXOs (unspent transaction outputs). When a client submits a transaction this provides proof for each of its inputs, that it is unspent. Here, for each of its inputs in its transaction, the client provides the location of the transaction output in the blockchain, that is being spent by this input. This is done by providing the Merkle path of hashes, which when all hashed together with the transaction referenced, will produce the Merkle root of the block containing this UTXO.

Figure 4E:
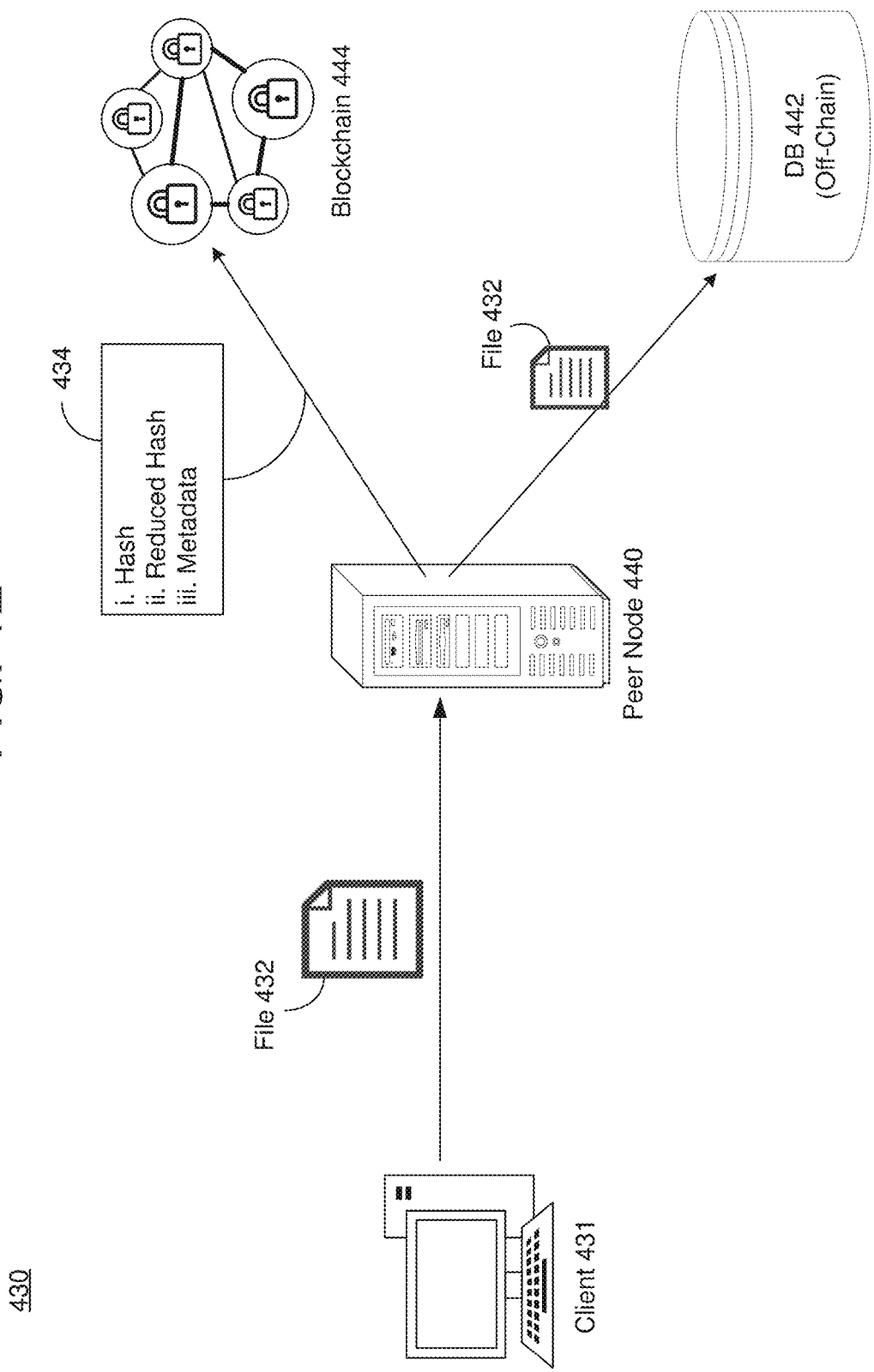
FIG. 4E is a diagram illustrating a process of storing a data file on blockchain based on a reduced-step hash according to example embodiments.

FIG. 4E illustrates a process 430 of storing a data file 432 on blockchain 444 based on a reduced-step hash according to example embodiments. In this example, a client 431 submits a data file 432 to a peer node 440 for storage on the blockchain 444. In this example, the client 431 may subsequent determine whether the data file 432 (which may be added within a blockchain transaction) has been tampered in any way. As a non-limiting example, the data file 431 may be a document, a video, an audio, a multi-media file, and the like. For example, a supplier may add an invoice document to the blockchain 444 as a transaction, for goods it delivered to a manufacturer. The manufacturer, also has a copy of the invoice, can verify the transaction on blockchain to ensure that its copy of the invoice is actually correct and has not been tampered with.

Referring to FIG. 4E, the peer node 440 may receive the data file 432 as well as a reduced-step hash of the file 432 and a full-step hash of the data file 432. In response, the peer node 440 may store a transaction 434 including the full-step hash and the reduced-step hash on the blockchain 444. Meanwhile, the data file 432 may be stored off-chain on a database 442 to conserve storage space on the blockchain. However, embodiments are not limited thereto and the data file may be stored on the blockchain 444. When the data file 432 is stored off-chain, the peer node 440 may store metadata of a location of the off-chain data file within the transaction 434 including the reduced-step hash and the full-step hash.

Accordingly, the data file 432 may be added as a transaction 434 to the blockchain 444 or an external database by the client 431. In this example, the reduced-step hash of the data file 432 may be used to verify the data file 432 is correct. For example, when another user (not shown) needs to access this data file 432, the user can retrieve the reduced-step hash and perform an approximate hash verification to verify the data file 432 is correct. In this case, the other user can generate a local copy of the reduced-step hash and compare it to the copy stored on the blockchain 444 to verify it has not been tampered with.

Figure 4F:
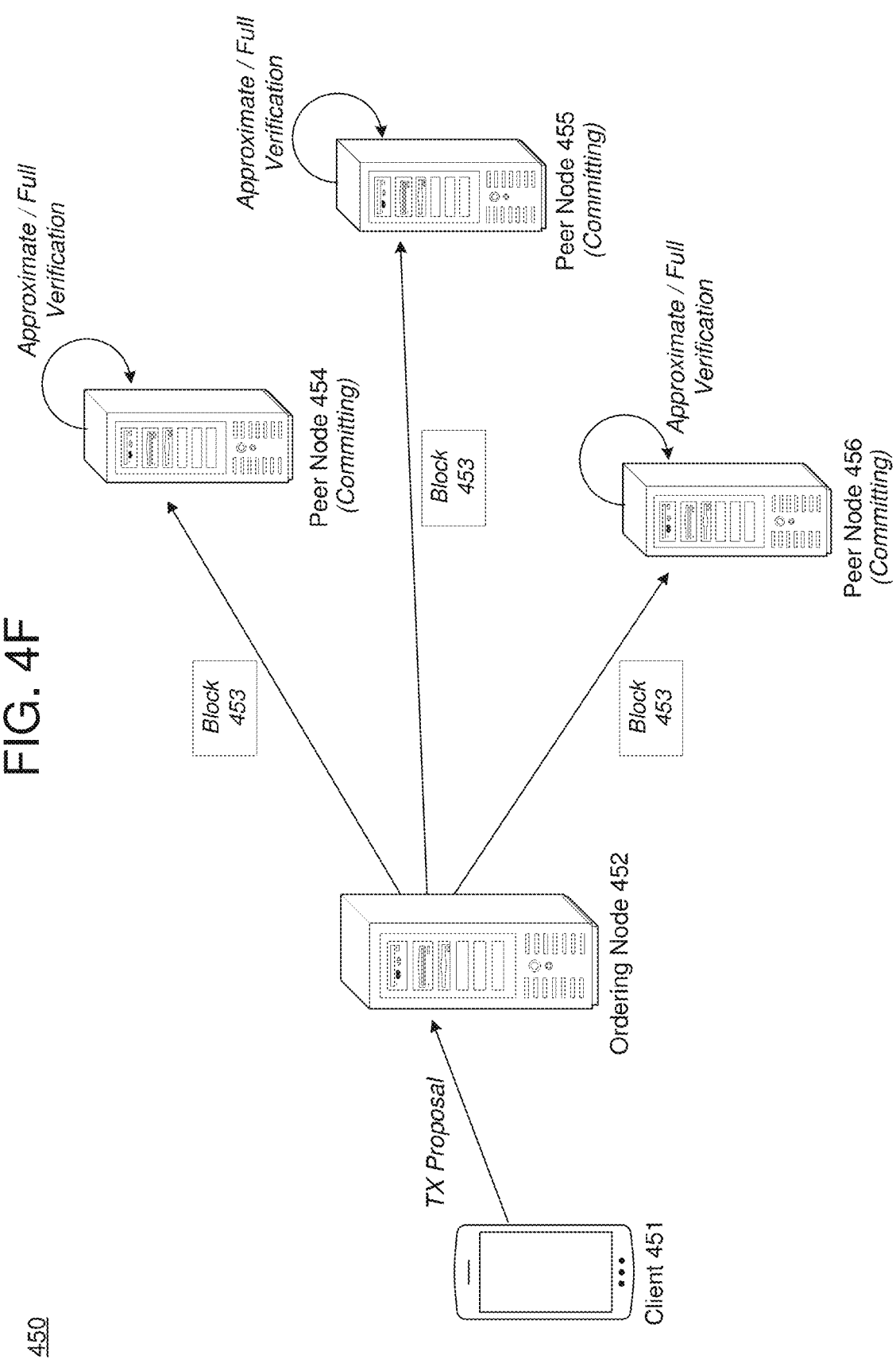
FIG. 4F is a diagram illustrating a process of committing data to blockchain based on an approximate verification according to example embodiments.

FIG. 4F illustrates a process 450 of committing data to blockchain based on an approximate verification according to example embodiments. In this example, a client 451 submits a transaction to an ordering node 452. The ordering node may arrange the transaction in a data block 453 with other transactions, and transmit the data block 453 to committing peer nodes 454, 455, and 456 within the blockchain network. The benefit here is that checking the authenticity of the client 451, integrity of the message/block, and performing any access control (e.g., is the client authorized to invoke this particular smart contract transaction), can be performed using approximate hash verification.

In this example, the client 451 may digitally sign the submitted transaction with their private key (the digital signature is an encryption operation on the hash of the transaction, and could in addition include the same encryption operation on the approximate hash as well). In this example, each of the committing peers 454-456 may verify the digital signature using the public key of the client. Here, if the signature for the transaction matches that of the client, the peer is assured that (a) no one other than the owner of the private key (the client) could have submitted the transaction, (b) no one altered the transaction from the time client signed it to when the peer received the transaction guaranteeing integrity of the transaction submission, and (c) check if the client is authorized to perform this operation, e.g., is the client spending their own funds or trying to spend someone else's (the latter would be denied as invalid; the signature permits this check). In this case, one or more of the peers 454-456 may perform an approximate hash verification check instead of the full hash-step check, if the client 451 included both the reduced-step hash as well as the original full-step hash of the transaction.

Furthermore, the blocks (including block 453) may be chained together using reduced-step hashes instead of full-step hashes. Therefore, before committing the block 453 to the blockchain (distributed ledger) the committing peer nodes 454-456 may perform an approximate hash verification on the chaining of the blocks and the transactions within the blocks.

Figure 4G:
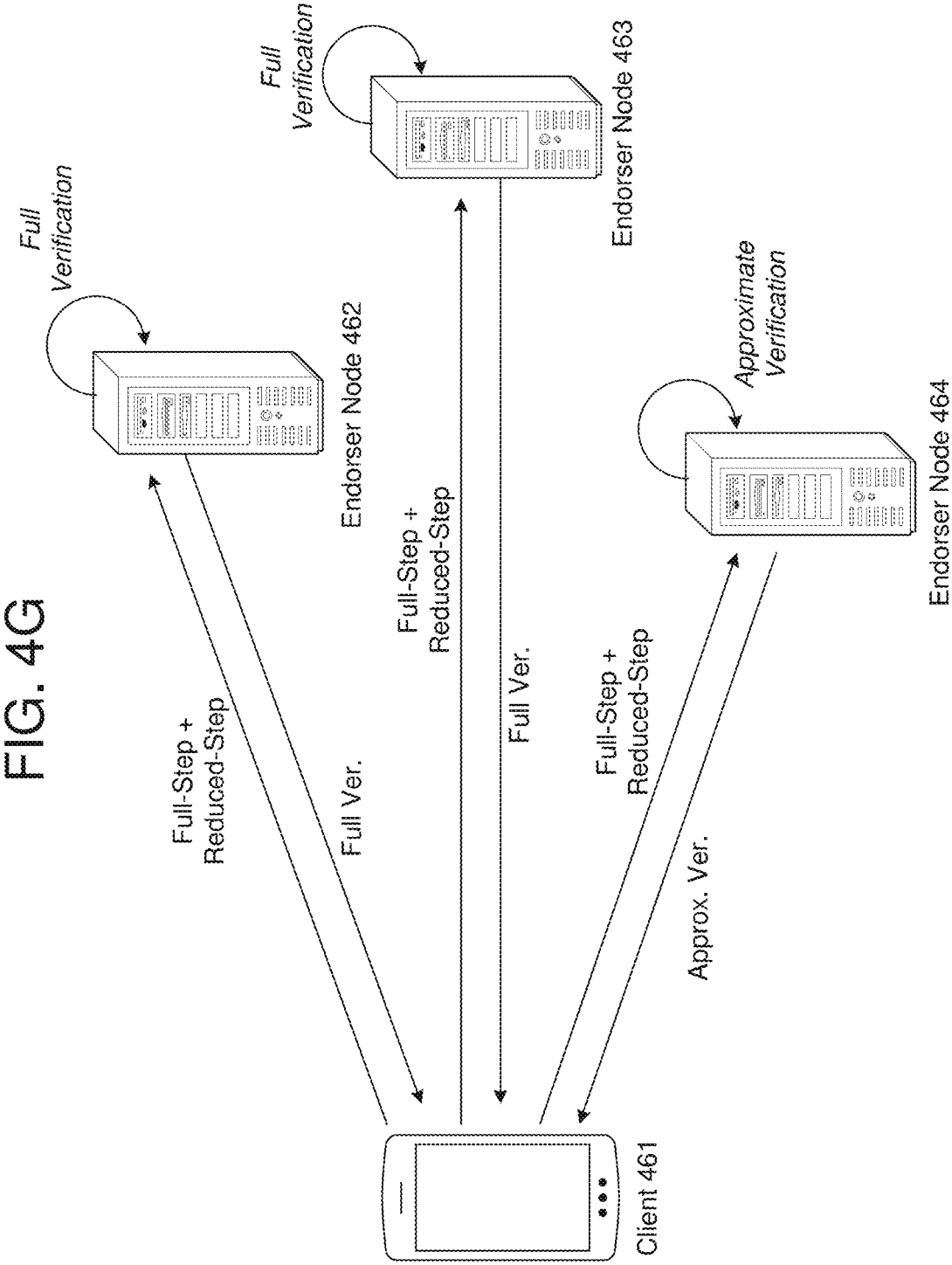
FIG. 4G is a diagram illustrating an endorsement process including approximate hash verification according to example embodiments.

FIG. 4G illustrates an endorsement process 460 which supports approximate hash verification according to example embodiments. Referring to FIG. 4G, a client 461 submits a transaction to a plurality of endorser nodes 462, 463, and 464. In this example, the transaction is signed by the client 461. The client 461 producing the signatures may produce both the original full-step hash value of the signature and the reduced-step hash value of the signature. Each of the endorser peer nodes 462, 463, and 464 may determine whether to verify just the approximate signature or the full signature.

In the endorsement process 460, there are two signatures that are verified. Each endorser 462-464 verifies the client signature. In this case, one or more of the endorsers could verify the original hash, while one or more other endorsers could verify just the approximate signature. Which endorser performs which verification may be defined in advance by an endorsement policy. Furthermore, the blockchain platform could additionally stipulate how many full nodes (non-approximating) must be present to ensure robustness/fault tolerance. For example, in addition to specifying k out of n endorsing peers must perform a full-step endorsement, the platform could specify that at most k' out of k endorsers apply reduced-step endorsement (each endorser in their signed response includes whether or not they applied approximation). During consensus, the blockchain protocol may specify maximum number of nodes that apply approximation. The endorser node verifying the approximate hash gains time and computation cost over the one that verifies the original.

In a second signature, each of the endorsers then execute the transactions and digitally sign the output. When they do so, they can add an approximate hash value as well, which is an intermediate step output. All peers in the network verify all the endorser's signatures to ensure all the endorsers have signed. Here again, peers can perform either a full verification or an approximate verification of all the endorser signatures for each transaction. If all signatures are valid, then the transaction is chosen to be committed to the ledger.

Whether or not an endorser performed an approximate verification can be denoted by an additional flag in the endorsement response (or any other confirmation message) stating this as true or false. Alternatively, when a peer joins the network, it could join as an 'approximate peer' informing other peers that it will only perform approximate verifications (e.g., a resource constrained node). This information may or may not be recorded on the blockchain. The blockchain configuration could also limit the number of such approximate peers in the network to ensure reliability.

Although not shown in FIGS. 4A-4G, Another dimension on which the example embodiments could be applied is in terms of which peers perform approximate verification. For example, an organization may run multiple peers in a network. One of the peers can be a full peer whereas other peers perform approximate verifications. If they make an error, they can refer to the full peer for the correct results. As another example, some peers in the network may be resource constrained (including IoT devices), which may find it difficult to keep pace with the other full peers. These resource constrained devices could perform approximate verifications to keep pace with the full peers in the network. As another example, peers can have a rotation policy on performing approximate verification. For example, a first peer can perform approximate verification for blocks 1-10, a second peer for blocks 11-20, and so on. This would permit each peer to save computation time and collectively the network can operate faster than when every node always performed the full verification.

Figure 5A:
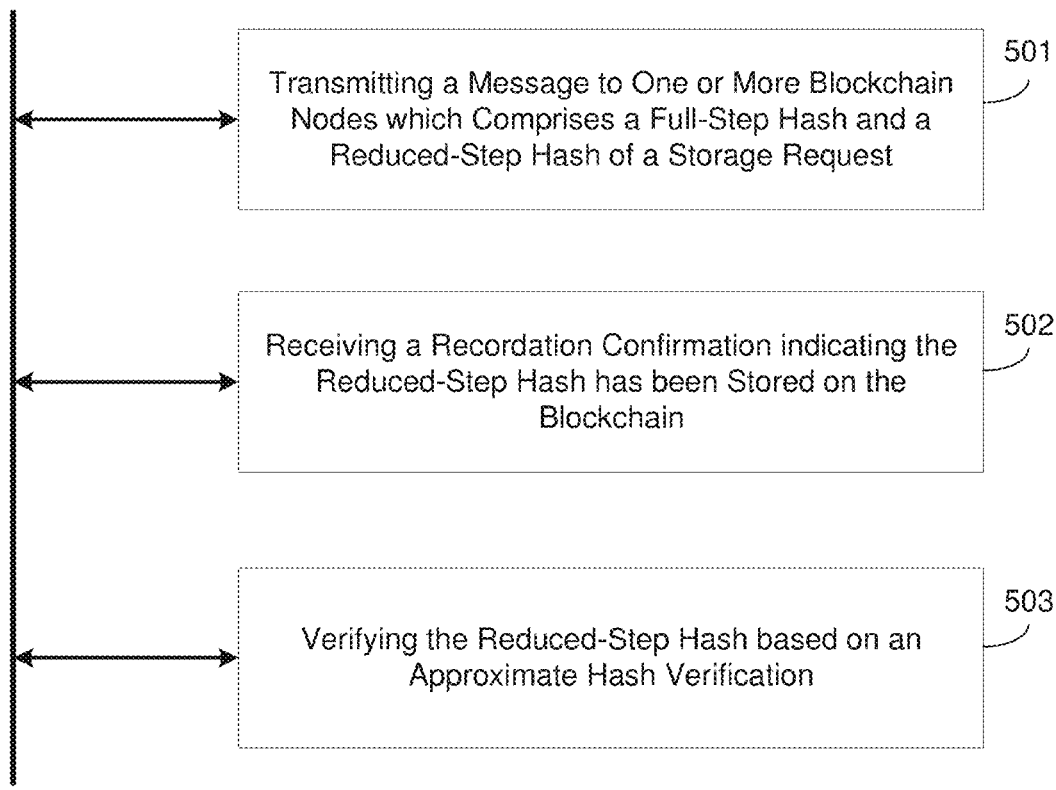
FIG. 5A is a diagram illustrating a method of storing a reduced-step hash of a transaction on a blockchain according to example embodiments.

FIG. 5A illustrates a method 500A of storing a reduced-step hash of a transaction on a blockchain according to example embodiments. For example, the method 500A may be performed by a client application of a blockchain. Referring to FIG. 5A, in 501, the method may include transmitting, from the client application, a message to one or more blockchain nodes to store a storage request on a blockchain. For example, the message may include a full-step hash of the storage request and a reduced-step hash of the storage request. In some embodiments, the method may further include generating the full-step hash of the storage request by repeatedly performing a hash function on a data value of the storage request a first predetermined number of times, and generating the reduced-step hash of the storage request by repeatedly performing the hash function on the data value of the storage request a second predetermined number of times that is less than the first predetermined number of times.

In some embodiments, a length of a data value created by the reduced-step hash of the storage request is equal to a length of a data value created by the full-step hash of the storage request. In some embodiments, the reduced-step hash of the storage request may be stored within a Merkle tree data structure of the blockchain. In some embodiments, the reduced-step hash of the storage request may include a reduced-step hash of a blockchain entry such as a transaction provided from the client.

In 502, the method may include receiving, from a blockchain node, a recordation confirmation indicating the reduced-step hash of the storage request is stored on the blockchain. Further, in 503, the method may include verifying, by the client application, whether the recordation of the storage request is correct based on an approximate hash verification of the reduced-step hash of the storage request. For example, the approximate hash verification may include generating the reduced-step hash of the storage request and comparing it to the reduced-step hash stored on the blockchain for verification without generating the full-step hash of the storage request. In some embodiments, the method may further include displaying a success notification via a user device of the client application, in response to the approximate hash verification of the reduced-step hash of the storage request being successful.

Figure 5B:
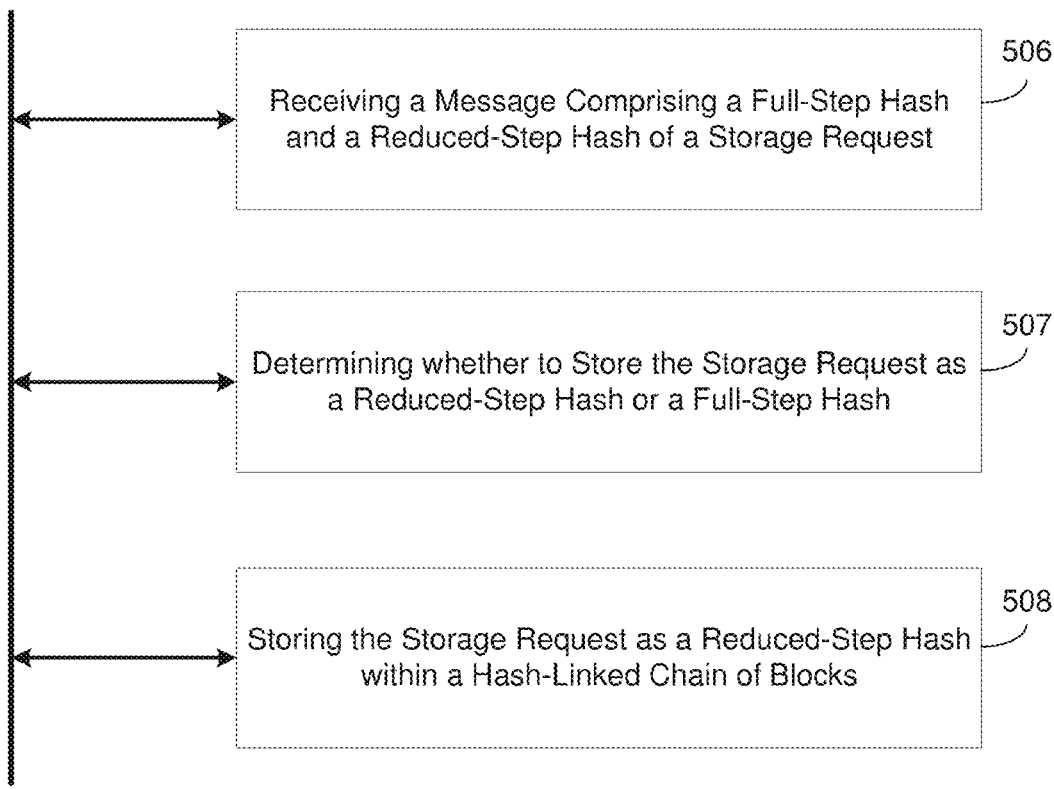
FIG. 5B is a diagram illustrating a method of performing an approximate hash verification of a transaction stored on a blockchain according to example embodiments.

FIG. 5B illustrates a method 500B of performing an approximate hash verification of a transaction stored on a blockchain according to example embodiments. For example, the method 500B may be performed by a peer node on a blockchain. Referring to FIG. 5B, in 506, the method may include receiving, from a client application, a message with a storage request for storage on a blockchain, the message comprising a full-step hash of the storage request and a reduced-step hash of the storage request. Here, the full-step hash may be generated by the client application repeatedly performing of a hash function on a data value of the storage request a first predetermined number of times, and the reduced-step hash may be generated by repeated performance of the hash function on the data value of the storage request a second predetermined number of times that is less than the first predetermined number of times.

In 507, the method may include determining, by the blockchain peer node, whether to store the storage request as the reduced-step hash or the full-step hash. For example, the determination may be random, predetermined by blockchain policy, deterministic based on an identifier in the storage request, or the like. In 508, in response to determining to store the storage request as the reduced-step hash, the method may include committing the reduced-step hash of the storage request to a block included in a hash-linked chain of blocks. In some embodiments, a length of a data value created by the reduced-step hash of the storage request is equal to a length of a data value created by the full-step hash of the storage request. In some embodiments, the committing may include storing the reduced-step hash of the storage request within a Merkle tree data structure of the blockchain. In some embodiments, the reduced-step hash of the storage request may include a reduced-step hash of a blockchain entry such as a transaction.

Figure 5C:
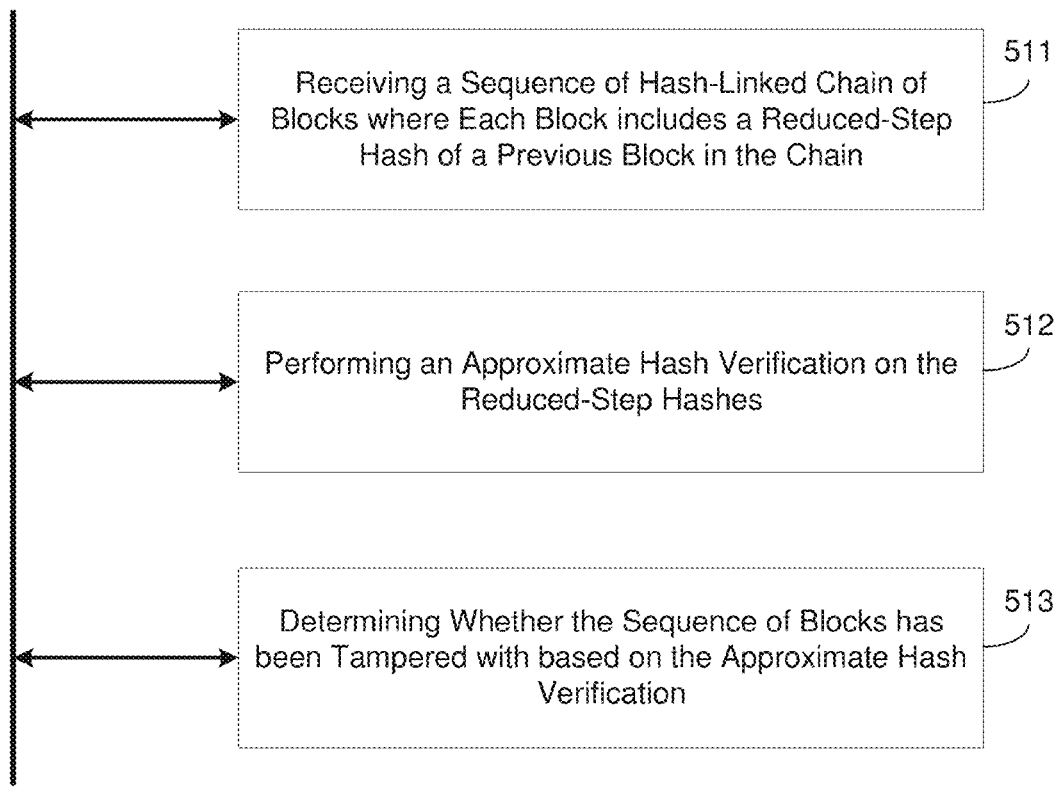
FIG. 5C is a diagram illustrating a method of a failed blockchain node performing recovery based on approximate hash verification according to example embodiments.

FIG. 5C illustrates a method 510A of a failed blockchain node performing recovery based on approximate hash verification according to example embodiments. Peer nodes may fail for all sorts of reasons such as power outage, malicious attack, maintenance, and the like. To recover missed blocks, the failed node may perform the method of FIG. 5C. Referring to FIG. 5C, in 511, the method may include receiving, from a blockchain peer node, a sequence of blocks stored in a hash-linked chain of blocks on a distributed ledger, where each block in the sequence of blocks includes a reduced-step hash of block content from a previous block in the sequence. In some embodiments, the method may further include transmitting, to the blockchain peer node, a request for the sequence of blocks in response to a crash at a failed blockchain peer node, or in response to a recovery operation at another blockchain peer node.

In 512, the method may include performing an approximate hash verification on the reduced-step hashes stored among the sequence of blocks. Further, in 513, the method may include determining whether the sequence of blocks has been tampered with based on the approximate hash verification on the reduced-step hashes. If the blocks have not been tampered with, the failed node can determine that the blocks are correct and store the blocks on the blockchain thereof. The approximate hash verification can compare the reduced-step hash within a block in the sequence to content included in a previous block linked by the reduced-step hash to determine whether the hash is correct. In this way, the node can perform a verification of each of the hash links using an approximate hash verification instead of a full-hash verification.

In some embodiments, the method may further include receiving, from a second blockchain peer node, a second version of the sequence of blocks where each block in the second version of the sequence of blocks includes a full-step hash of block content from a previous block in the sequence, wherein the full-step hash comprises repeated performance of a hash function on hash content a greater number of times than the reduced-step hash. In some embodiments, the method may further include verifying the sequence of blocks which includes the reduced-step hashes received from the blockchain peer node based on the second version of the sequence of blocks which includes the full-step hashes received from the second blockchain peer node. In some embodiments, each block among the sequence of blocks may include a reduced-step hash of a header of a previous block in the chain. To verify the link, the node may verify the reduced-step hash of the header by calculating the same reduced-step hash. In some embodiments, the approximate hash verification may verify, for each block in the sequence, that a reduced-step hash of a header of a previous block in the sequence is included the respective block.

Figure 5D:
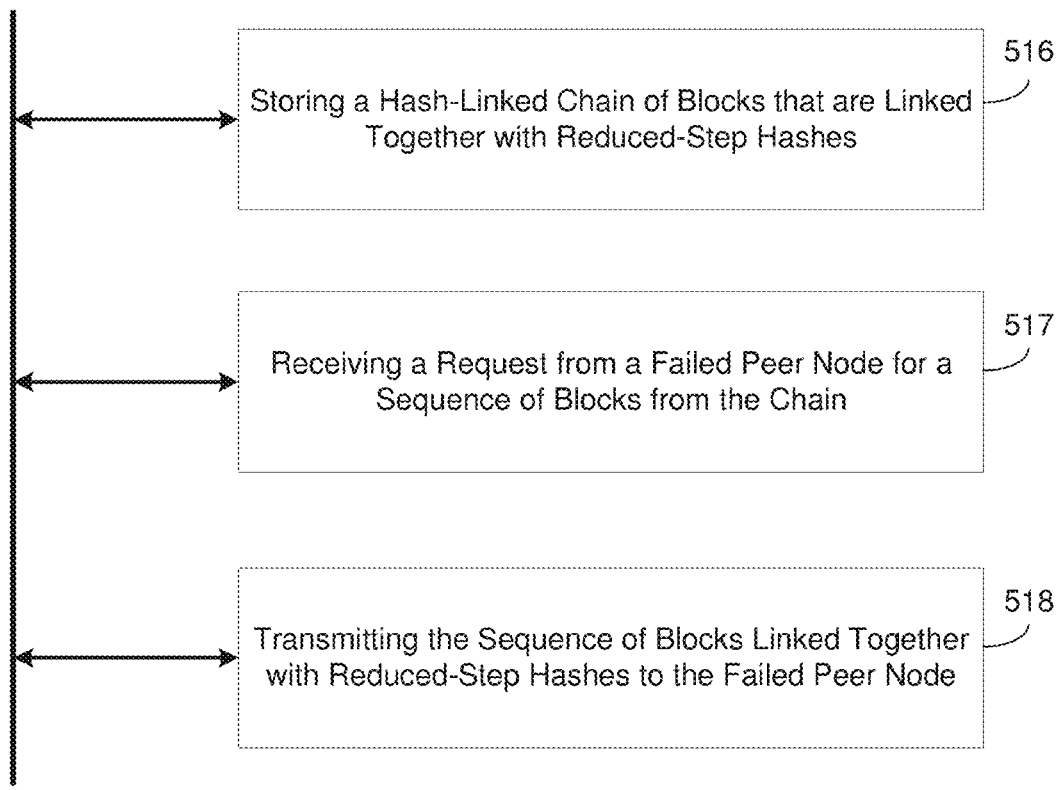
FIG. 5D is a diagram illustrating a method of transmitting a sequence of blocks with reduced-step hashes according to example embodiments.

FIG. 5D illustrates a method 510B of transmitting a sequence of blocks with reduced-step hashes according to example embodiments. For example, the method 510B may be performed by a recovery node on a blockchain for recovering peer nodes that fail. In 516, the method may include storing a hash-linked chain of blocks via a blockchain ledger, wherein the hash-linked chain of blocks are linked together via hash content that is generated using a reduced-step hash. Here, the blocks are linked with reduced-step hashes of a previous block instead of full-step hashes.

In 517, the method may further include receiving a request from a failed peer node for a sequence of blocks from among the stored hash-linked chain of blocks. Failure may occur when a node is offline or records a corrupt sequence of blocks. In 518, the method may include transmitting the requested sequence of blocks which are linked together using reduced-step hash content to the failed peer node.

In some embodiments, the method may further include receiving block content of the hash-linked chain of blocks which includes a full-step hash of the block content and the reduced-step hash of the block content. In some embodiments, the full-step hash of the block content may be created by repeated performance of a hash function a first predetermined number of times, and the reduced-step hash of the block content is created by repeated performance of the hash function a second predetermined number of times that is less than the first predetermined number of times. In some embodiments, the method may further include determining to transmit the sequence of blocks that are linked together via the reduced-step hash content rather than the full-step hash content based on a predetermined blockchain policy. In some embodiments, each block among the sequence of blocks may include a reduced-step hash of a header of a previous block in the chain.

Figure 5E:
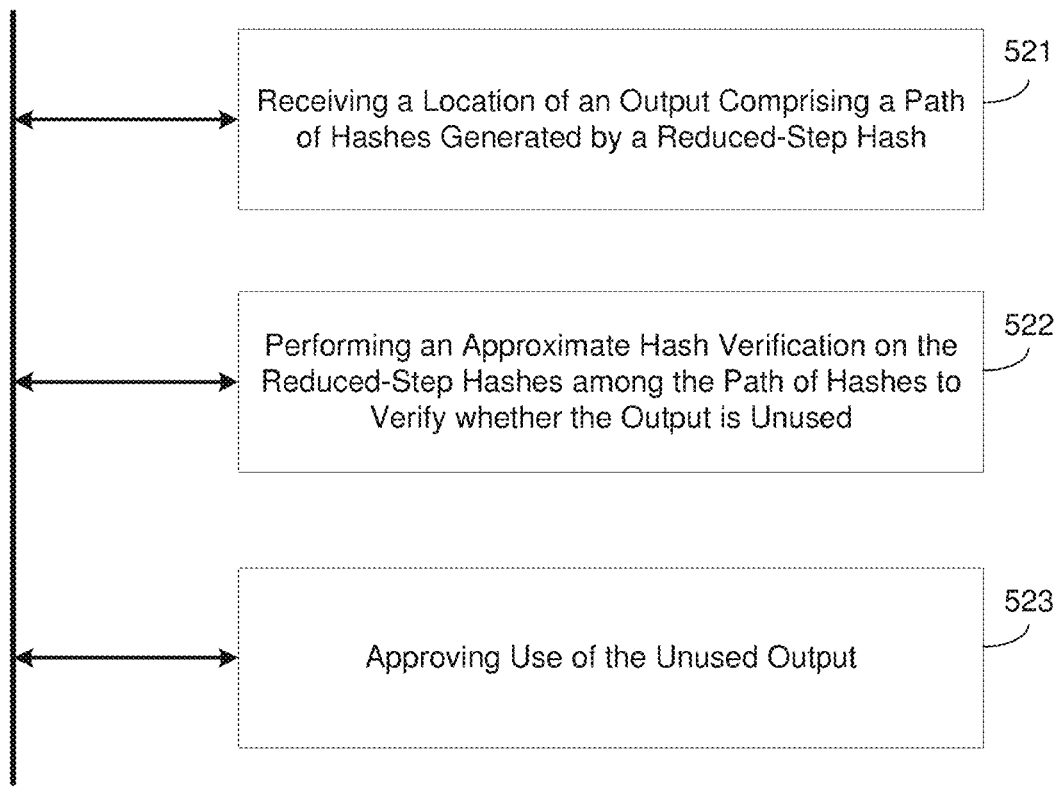
FIG. 5E is a diagram illustrating a method of determining whether a transaction is unspent based on an approximate hash verification according to example embodiments.

FIG. 5E illustrates a method 520A of determining whether a transaction is unspent based on an approximate hash verification according to example embodiments. For example, the unspent transaction verification may be performed by a peer node. Referring to FIG. 5E, in 521, the method may include receiving a location of an output stored on a data structure of a blockchain, where the location comprises a path of hashes generated by a reduced-step hash instead of a full-step hash of the blockchain. In this example, the location may include a block within a hash-linked chain of blocks. The location may be identified through a sequence of hashes that are based on a path of a transaction to a root node in a data structure storing the transaction. In this example, the path of hashes, when hashed together, may produce an identifier of a data block in the blockchain storing the unused output. In this example, the full-step hash may include repeated performance of a hash function a first predetermined number of times, and the reduced-step hash may include repeated performance of the hash function a second predetermined number of times that is less than the first predetermined number of times.

In 522, the method may include performing an approximate hash verification on the path of hashes based on the reduced-step hash values to verify whether the output is unused. Furthermore, in response to a determination that the output is unused as a result of the approximate hash verification, in 523 the method may further include approving a use of the output by a client associated with the output. In some embodiments, the approximate hash verification may include generating a reduced-step hash of each node in the path, and verifying whether the generated result is the identifier of the data block.

In some embodiments, the path of hashes may include a path of hashes on a Merkle tree from a node corresponding to a transaction to a root node of the Merkle tree. In some embodiments, each node on the path may include a reduced-step hash of data from its child nodes in the data structure. In some embodiments, the method may further include preventing the use of the output, in response to determining that the output is used as a result of the approximate hash verification.

Figure 5F:
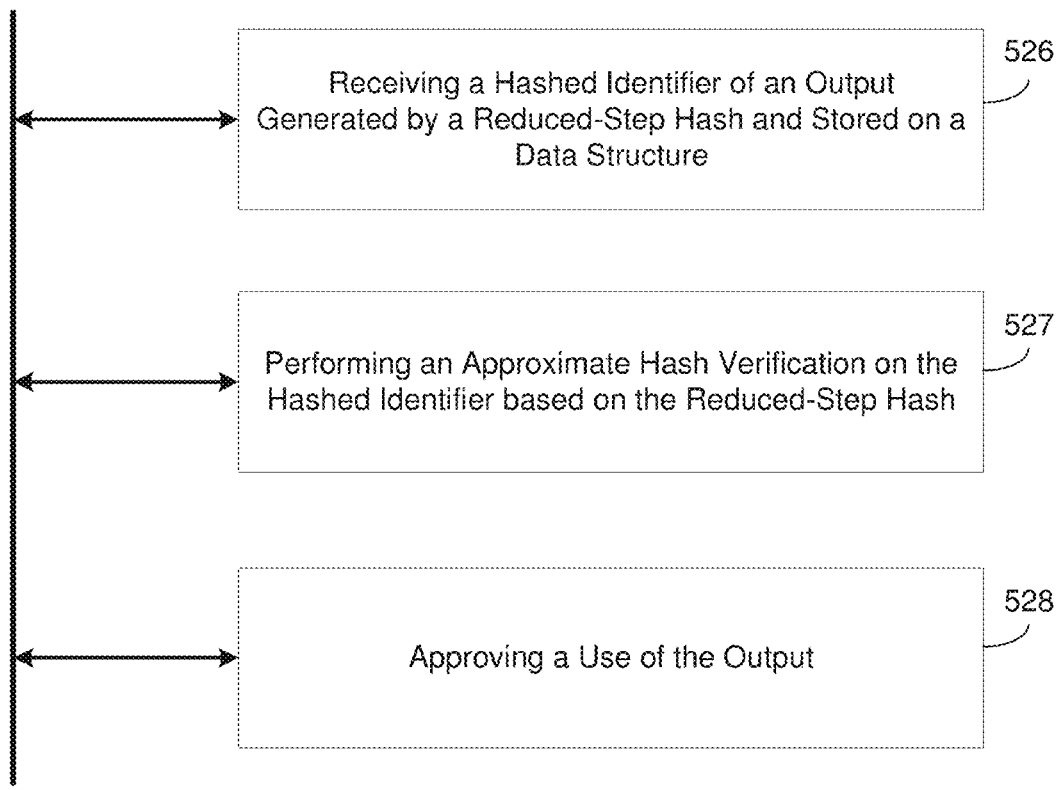
FIG. 5F is a diagram illustrating another method of determining whether a transaction is unspent based on an approximate hash verification according to example embodiments.

FIG. 5F illustrates another method 520B of determining whether a transaction is unspent based on an approximate hash verification according to example embodiments. Referring to FIG. 5F, in 526, the method may include receiving a hashed identifier of an output stored on a data structure of a blockchain, where the hashed identifier is generated by a reduced-step hash instead of a full-step hash of the blockchain. In this example, the hashed identifier may include an identification of a data block in the blockchain storing the unused output.

In 527, the method may include performing an approximate hash verification on the hashed identifier based on the reduced-step hash to verify whether the output is unused. In response to a determination that the output is unused as a result of the approximate hash verification, in 528 the method may include approving a use of the output by a client associated with the output. In some embodiments, the hashed identifier may be generated by performing a chain of reduced-step hashes based on a path of the output stored in a blockchain data structure. In some embodiments, the method may further include, in response to determining that the output is used as a result of the approximate hash verification, preventing the use of the output. In some embodiments, the method may further include storing hashed identifiers of a plurality of data blocks and identifiers of the outputs stored in each data block.

Figure 5G:
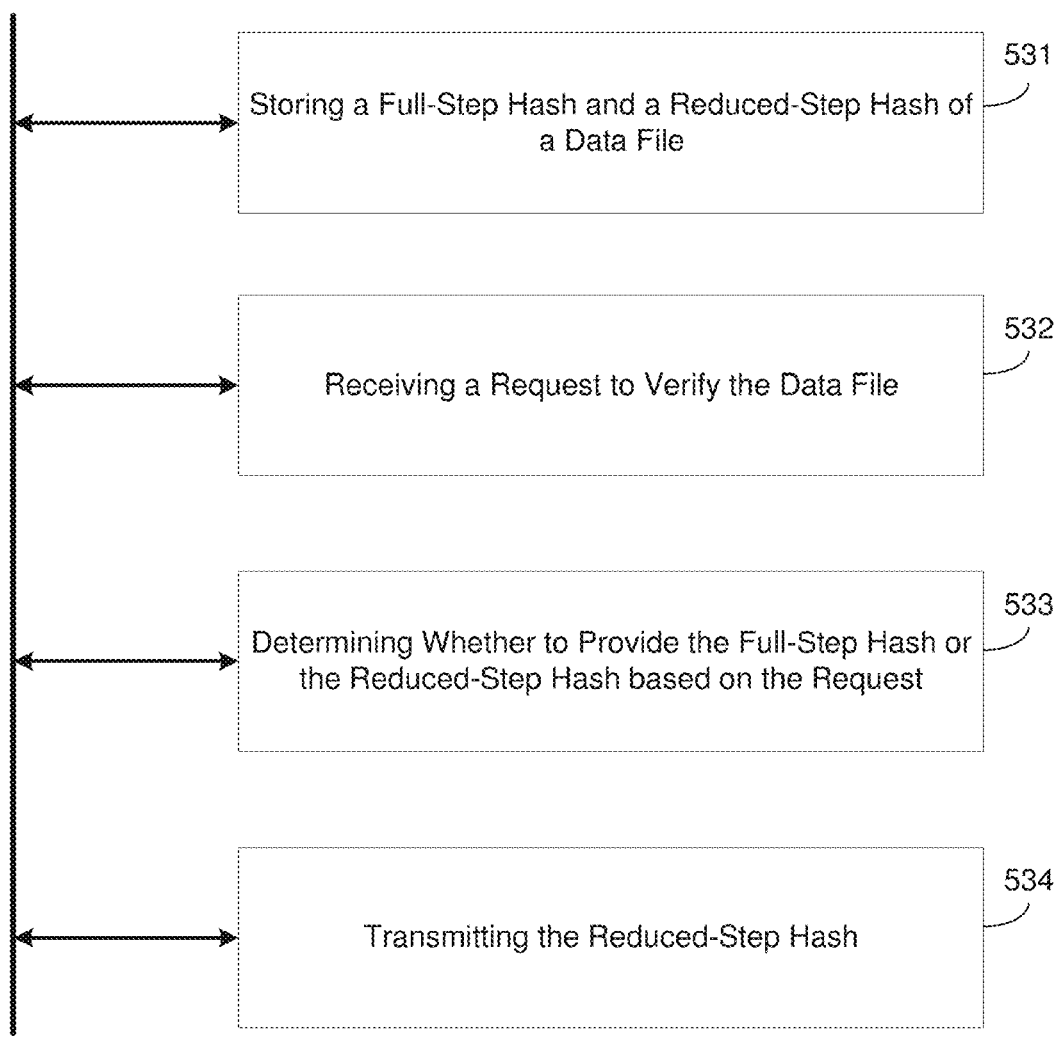
FIG. 5G is a diagram illustrating a method of storing a reduced-step hash of a media file on a blockchain according to example embodiments.

FIG. 5G illustrates a method 530A of storing a reduced-step hash of a media file on a blockchain according to example embodiments. For example, the method may be performed by a peer node storing a hash of the media file. Referring to FIG. 5G, in 531 the method may include storing a full-step hash of a data file and a reduced-step hash of the data file within a data block of a hash-linked chain of blocks of a blockchain. For example, the data file may include one or more of an audio file, a video file, a document, an image, and a multi-media file.

In 532, the method may include receiving a request from a client application to verify the data file. In response, in 533, the method may include determining whether to provide the full-step hash of the data file or the reduced-step hash of the data file based on the request, and in response to determining to provide the reduced-step hash, in 534 the method may include transmitting the reduced-step hash of the data file to the client application. In these examples, the full-step hash of the data file may be generated by repeated performance of a hash function on the data file a first predetermined number of times, and the reduced-step hash of the data file may be generated by repeated performance of the hash function on the data file a second predetermined number of times that is less than the first predetermined number of times.

In some embodiments, the determining to provide the reduced-step hash of the data file is based on one or more of a predetermined policy of the blockchain and a notification element within the received request. As another example, the determining may be based on an identifier within the request from the client (or other node), or the like. In some embodiments, the full-step hash of the data file and the reduced-step hash of the data file are both received from a different client application than the client application that submitted the request.

Figure 5H:
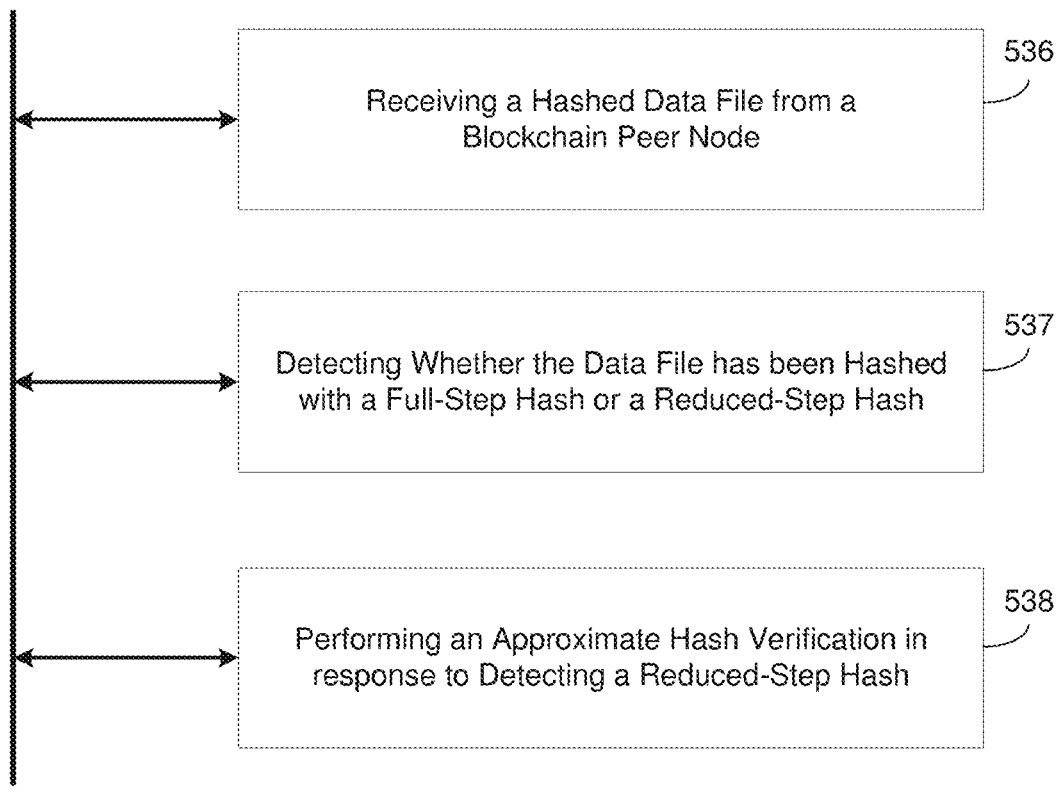
FIG. 5H is a diagram illustrating a method of performing an approximate hash verification on a media file stored on blockchain according to example embodiments.

FIG. 5H illustrates a method 530B of performing an approximate hash verification on a media file stored on blockchain according to example embodiments. The method may be performed by a client node, a peer node, or the like. In 536, the method may include receiving a hashed data file from a blockchain peer node, where data of the hashed data file is previously stored within a hash-linked chain of blocks on a blockchain. In this example, the hashed data file may include a hash of one or more of an audio file, a video file, a document, an image, and a multi-media file.

In 537, the method may include detecting whether the hashed data file has been hashed using a full-step hash or a reduced-step hash. In response to a detecting that the hashed data file is hashed using the reduced-step hash, in 538 the method may include determining whether the hashed data file has been tampered with through an approximate hash verification of the hashed data file. In some embodiments, the full-step hash may include repeated performance of a hash function on the data file a first predetermined number of times, and the reduced-step hash comprises repeated performance of the hash function on the data file a second predetermined number of times that is less than the first predetermined number of times.

In some embodiments, a length of a data value created by the reduced-step hash applied to the data file is equal to a length of a data value created by the full-step hash applied to the data file. In some embodiments, the determining may include generating a reduced-step hash of a local copy of the data file and verifying the retrieved hashed data file based on the reduced-step hash of the local copy of the data file. In some embodiments, the data file may include a media file that is stored off-chain while a hash result of the hashed data file is stored within a data block among the hash-linked chain of blocks.

Figure 5I:
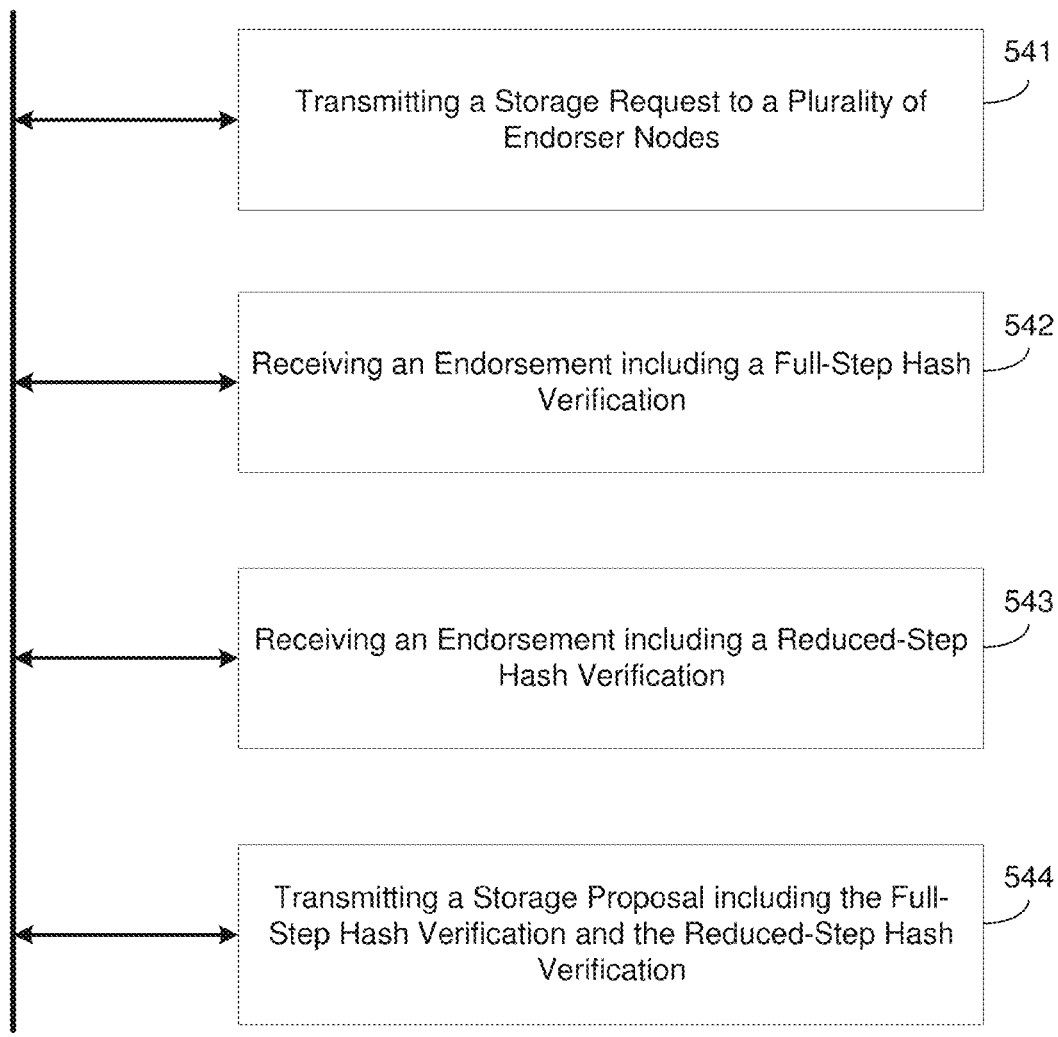
FIG. 5I is a diagram illustrating a method of approximate hash verification among endorser nodes according to example embodiments.

FIG. 5I illustrates a method 540A of approximate hash verification among endorser nodes according to example embodiments. For example, the method 540A may be performed by a client node receiving endorsements from a plurality of peer (endorser nodes) on the blockchain. Referring to FIG. 5I, in 541, the method may include transmitting, from a client application, a proposed storage request to a plurality of endorser nodes of a blockchain. Here, the transmitting may include transmitting a full-step hash of the proposed storage request signed by the client application and a reduced-step hash of the storage request signed by the client application to the plurality of endorser nodes.

In 542, the method may include receiving a first endorsement of the storage request from a first endorser node, the first endorsement comprising a full-step hash verification of the proposed storage request. Furthermore, in 543, the method may include receiving a second endorsement of the storage request from a second endorser node, the second endorsement comprising a reduced-step hash verification of the storage request. According to various embodiments, the full-step hash verification may include a verification of the full-step hash of the proposed storage request signed by the client application and the reduced-step hash verification comprises an approximate verification of the reduced-step hash of the proposed storage request signed by the client application.

In 544, the method may further include transmitting a storage proposal including the full-step hash endorsement and the reduced-step hash endorsement to an ordering node of the blockchain. For example, the proposed storage request may include a blockchain entry such as a transaction to be stored in a data block among a hash-linked chain of data blocks.

In some embodiments, a length of a data value created by the reduced-step hash of the proposed storage request is equal to a length of a data value created by the full-step hash of the proposed storage request. In some embodiments, the full-step hash may include repeated performance of a hash function on a data value of the proposed storage request a first predetermined number of times, and the reduced-step hash may include repeated performance of the hash function on the data value of the proposed storage request a second predetermined number of times that is less than the first predetermined number of times. In some embodiments, the second endorsement may be received via a message which comprises a message element indicating the message comprises the reduced-step hash verification.

Figure 5J:
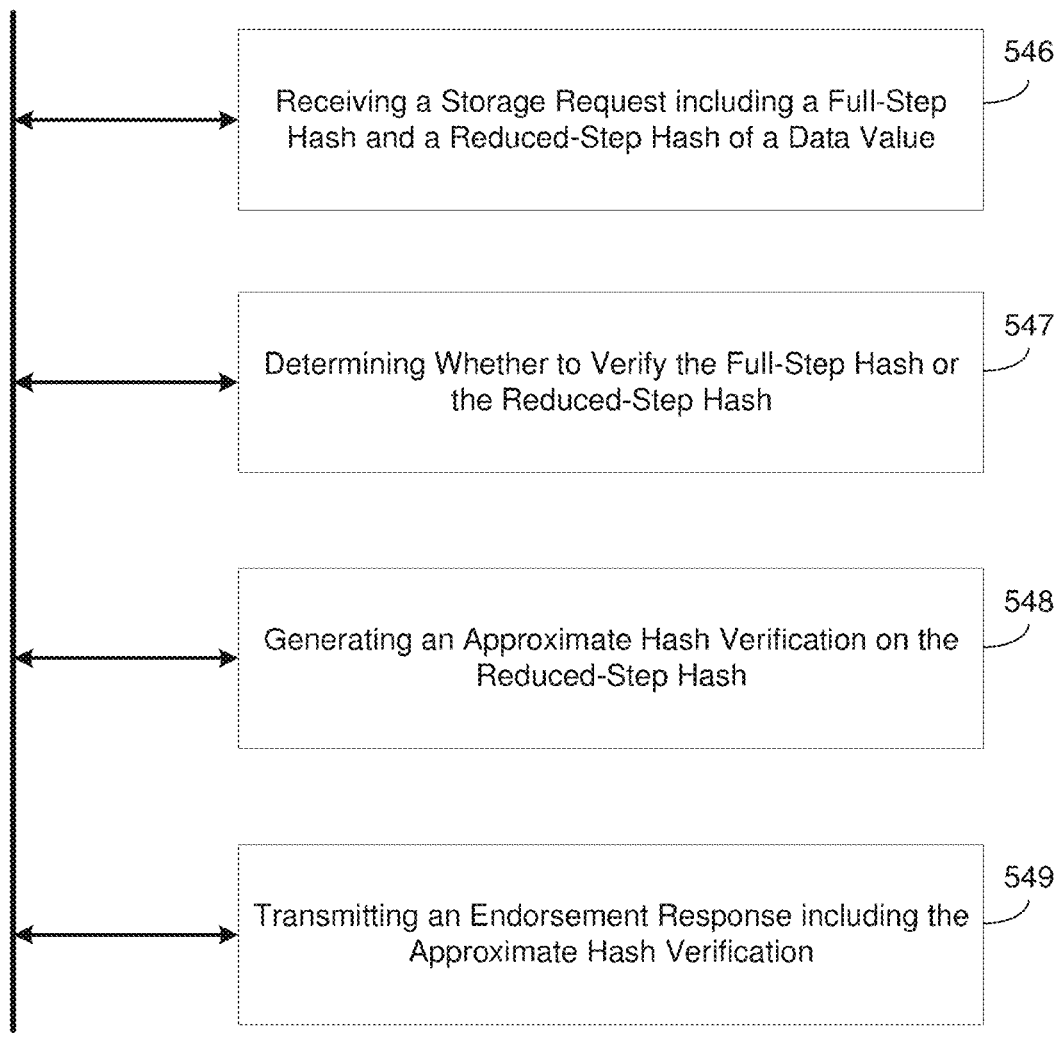
FIG. 5J is a diagram illustrating a method of endorsing a transaction with a reduced-step hash verification according to example embodiments.

FIG. 5J illustrates a method 540B of endorsing a transaction with a reduced-step hash verification according to example embodiments. The method may be performed by an endorser node in a blockchain. Referring to FIG. 5J, in 546 the method may include receiving, from a client application, a storage request that comprises a full-step hash of a data value signed by the client application and a reduced-step hash of the data value signed by the client application. For example, the full-step hash of the data value may be generated by repeated performance of a hash function a first predetermined number of times, and the reduced-step hash of the data value may be generated by repeated performance of the hash function a second predetermined number of times that is less than the first predetermined number of times.

In 547, the method may include determining whether to verify the full-step hash of the storage request or the reduced-step hash of the storage request. Here, the determination may be based on a blockchain policy, a predetermined instruction, an element in the message, randomly, or the like. In response to a determination to verify the reduced-step hash of the storage request, in 548 the method may include generating an approximate hash verification for the reduced-step hash of the data value, and in 549, the method may include transmitting an endorsement response to the client application which includes the generated approximate hash verification.

In some embodiments, the transmitting may further include transmitting an indicator within the endorsement response indicating the approximate hash verification has been performed. In some embodiments, the storage request may include a blockchain entry for storage within a data block among a hash-linked chain of data blocks. In some embodiments, the method may further include executing the proposed storage request and generating a hash of the proposed storage request with a reduced-step hash.

Figure 5K:
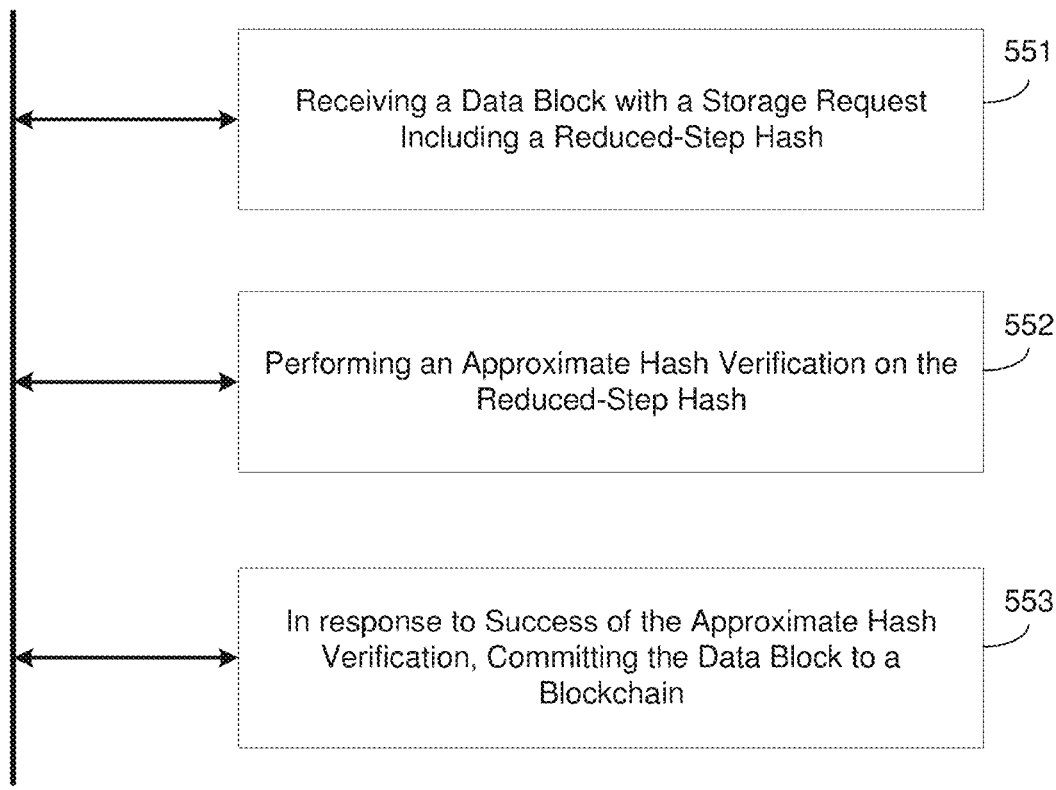
FIG. 5K is a diagram illustrating a method of performing an approximate hash verification on a data block according to example embodiments.

FIG. 5K illustrates a method 550A of performing an approximate hash verification on a data block according to example embodiments. For example, the method may be performed by a blockchain peer node that manages and stores a replica of a distribute ledger including the blockchain. Referring to FIG. 5K, in 551, the method may include receiving a data block for storage on a blockchain from an orderer node, where the data block may include a full-step hash of a storage request and a reduced-step hash of the storage request. Here, the full-step hash of the storage request may be generated by application of a hash function a first predetermined number of times and the reduced-step hash of the storage request may be generated by application of the hash function a second predetermined number of times that is less than the first predetermined number of times.

In 552, the method may include performing an approximate hash verification on the data block based on the reduced-step hash of the storage request included in the data block. Further, in 553, the method may include, in response to a success of the approximate hash verification, committing the data block among a hash-linked chain of data blocks stored within a distributed ledger of a blockchain. In this example, the storage request may be a transaction that is stored within a Merkle tree data structure of the data block.

In some embodiments, the method may further include determining whether to perform a full-step hash verification or the approximate hash verification based on a random protocol. In some embodiments, the approximate hash verification may include generating the reduced-step hash of the storage request for verification without generating the full-step hash of the storage request. In some embodiments, the method may further include, in response to a failure of the approximate hash verification, committing the data block to the hash-linked chain of data blocks stored within a distributed ledger of a blockchain with an indicator that the storage request failed. In some embodiments, the committing may include storing the approximate hash verification in the data block of the hash-linked chain of blocks and storing a file included in the storage proposal within an off-chain storage.

Figure 5L:
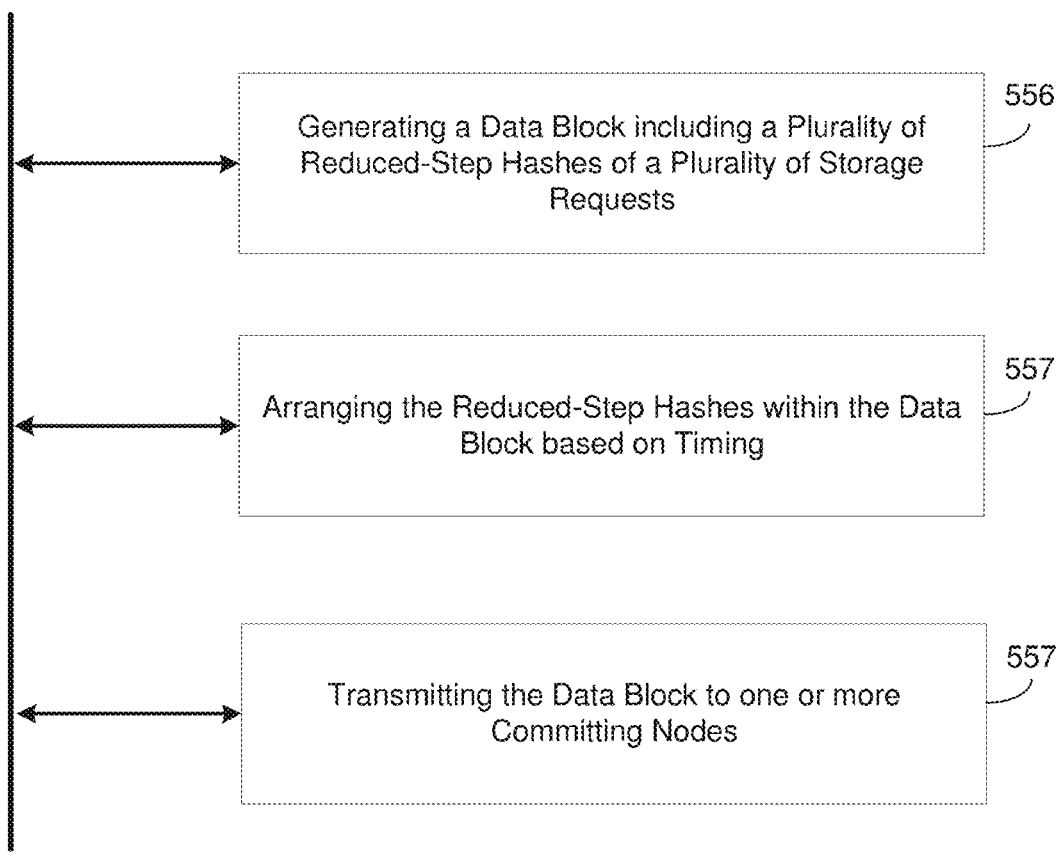
FIG. 5L is a diagram illustrating a method of ordering reduced-step hashes of transactions in a data block according to example embodiments.

FIG. 5L illustrates a method 550B of ordering reduced-step hashes of transactions in a data block according to example embodiments. For example, the method may be performed by an ordering node on a blockchain. Referring to FIG. 5L, in 556, the method may include receiving reduced-step hashes and full-step hashes of a plurality of storage requests from a plurality of client applications, respectively. In 557, the method may include arranging the reduced-step hashes within a data block based on timing information such as a timestamp, etc. included in the storage requests. Here, the storage requests may include different transactions from different parties on the blockchain.

In 558, the method may include transmitting the data block with the ordered reduced-step hashes to a plurality of blockchain peer nodes for inclusion within a blockchain. For example, the full-step hash of a storage request may be generated by application of a hash function a first predetermined number of times and a reduced-step hash of the storage request may be generated by application of the hash function a second predetermined number of times that is less than the first predetermined number of times.

In some embodiments, the hash function may include a non-linear function that is applied to content within the storage request. In some embodiments, a length of a data value created by the full-step hash of the storage request is equal to a length of a data value created by the reduced-step hash of the storage request. In some embodiments, the arranging may include arranging the reduced-step hashes within the data block in a chronological order of in which they were received. In some embodiments, the method may further include storing the full-step hashes with the reduced-step hashes in the data block.

Figure 6A:
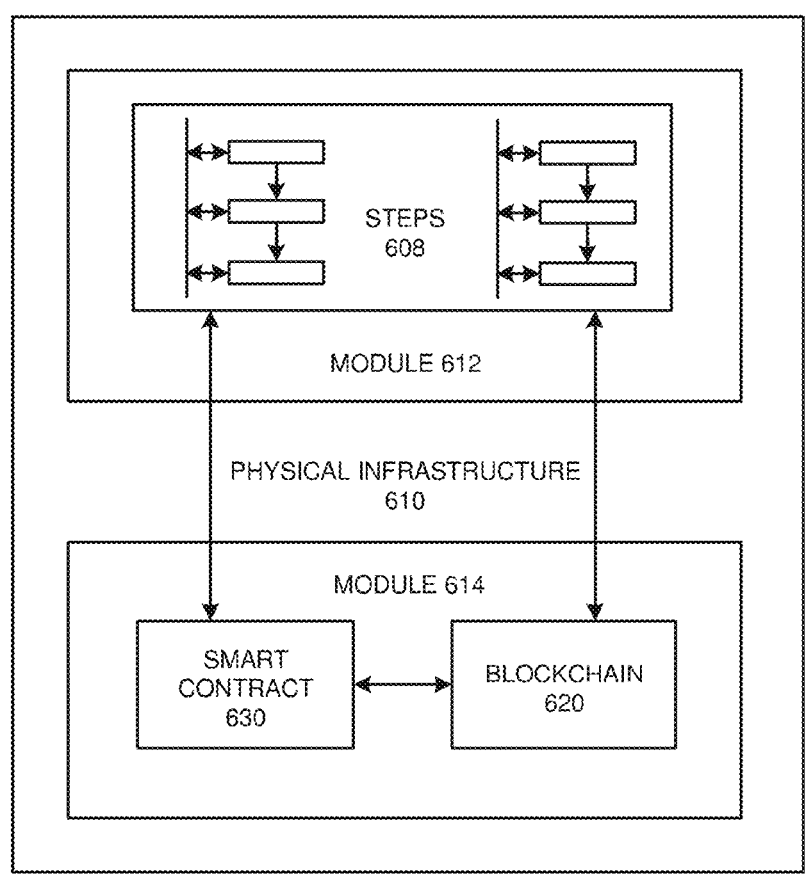
FIG. 6A is a diagram illustrating an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
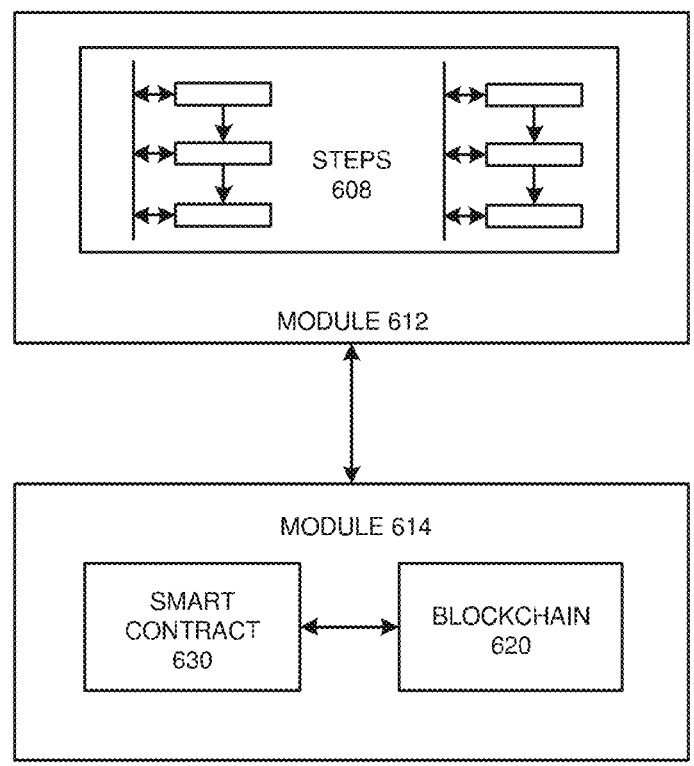
FIG. 6B is a diagram illustrating another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
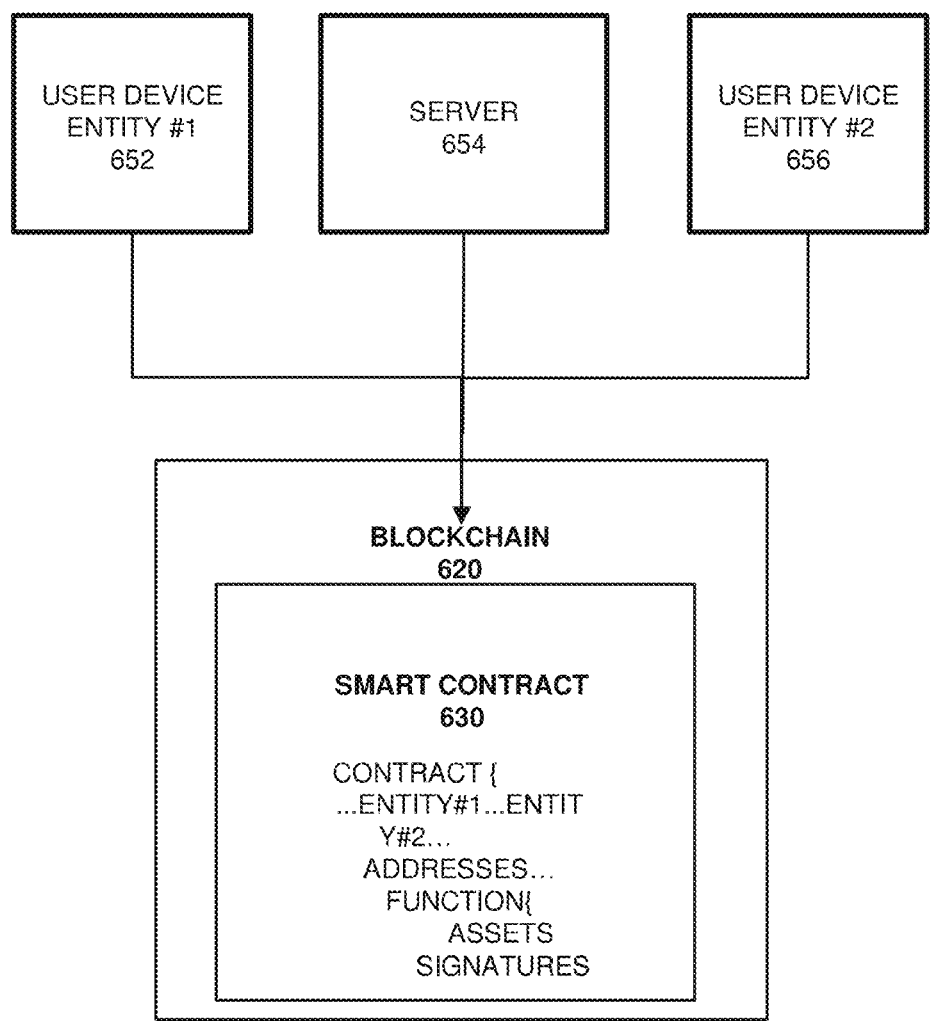
FIG. 6C is a diagram illustrating a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
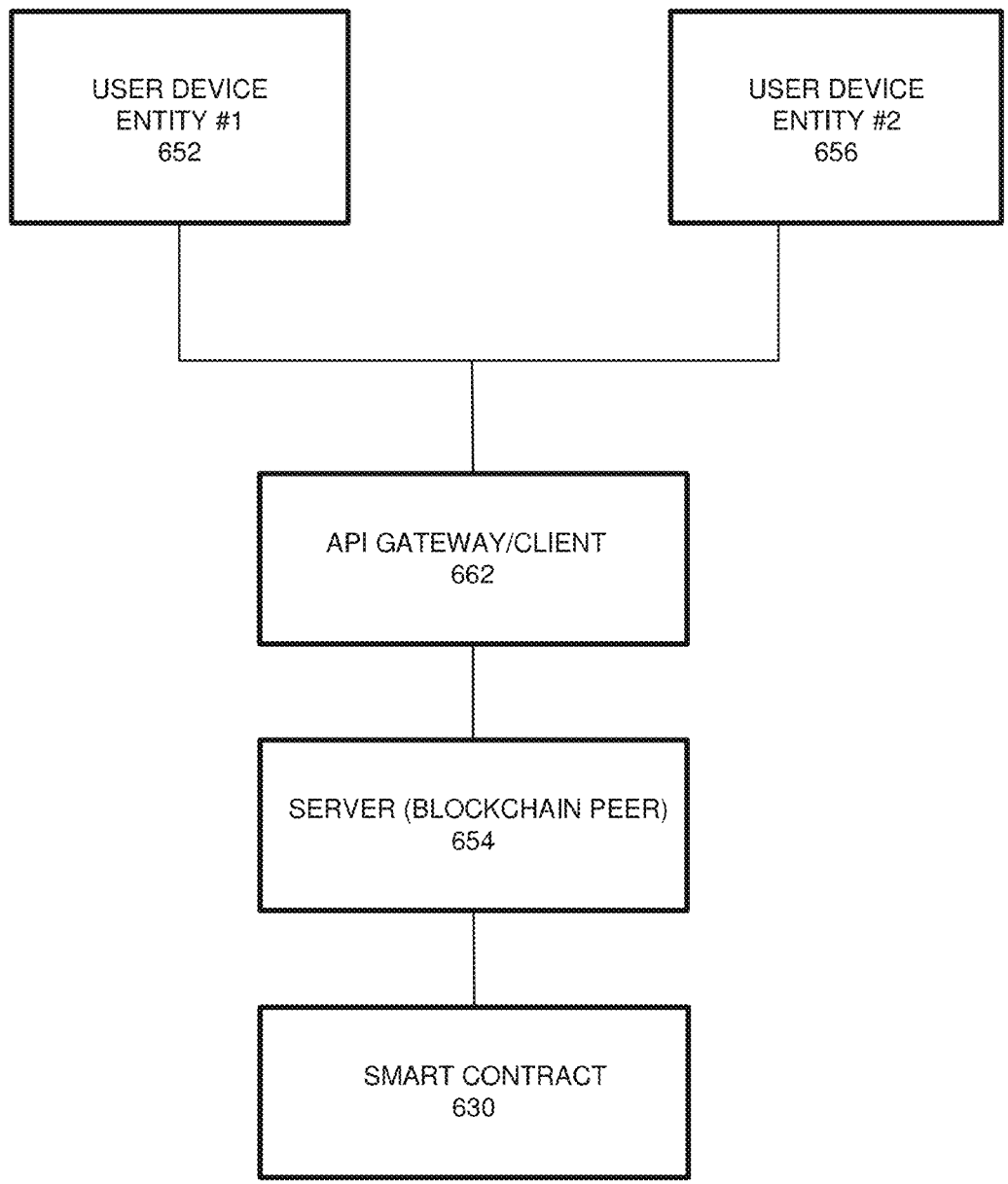
FIG. 6D is a diagram illustrating yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7B:
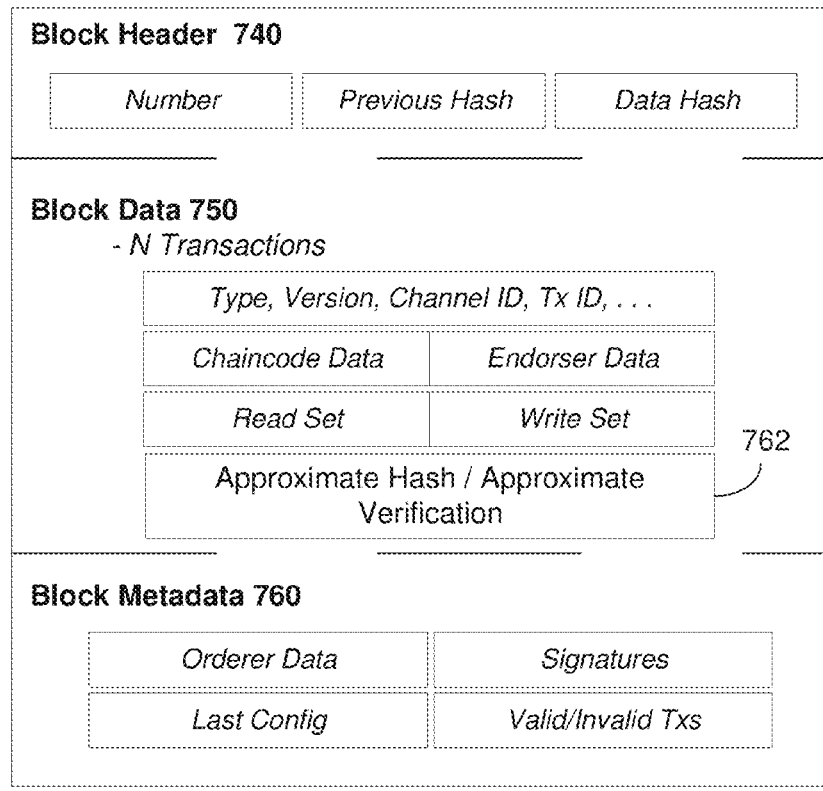
FIG. 7B is a diagram illustrating data contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store approximate hash verification data 762 which may include a reduced-step hash, a full-step hash, an approximate verification, a full verification, and the like, within a data block among a hash-linked chain of blocks in the blockchain 722. The approximate hash verification data 762 may be generated based on one or more of the steps, features, processes and/or actions described or depicted herein. Accordingly, the approximate hash verification data 762 can be stored in an immutable log of blocks on the distributed ledger 720. Some of the benefits of storing the approximate hash verification data 762 include conserving computational resources when verifying a hash value stored and/or transmitted in association with the blockchain 720. Although in FIG. 7B the blockchain verification data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
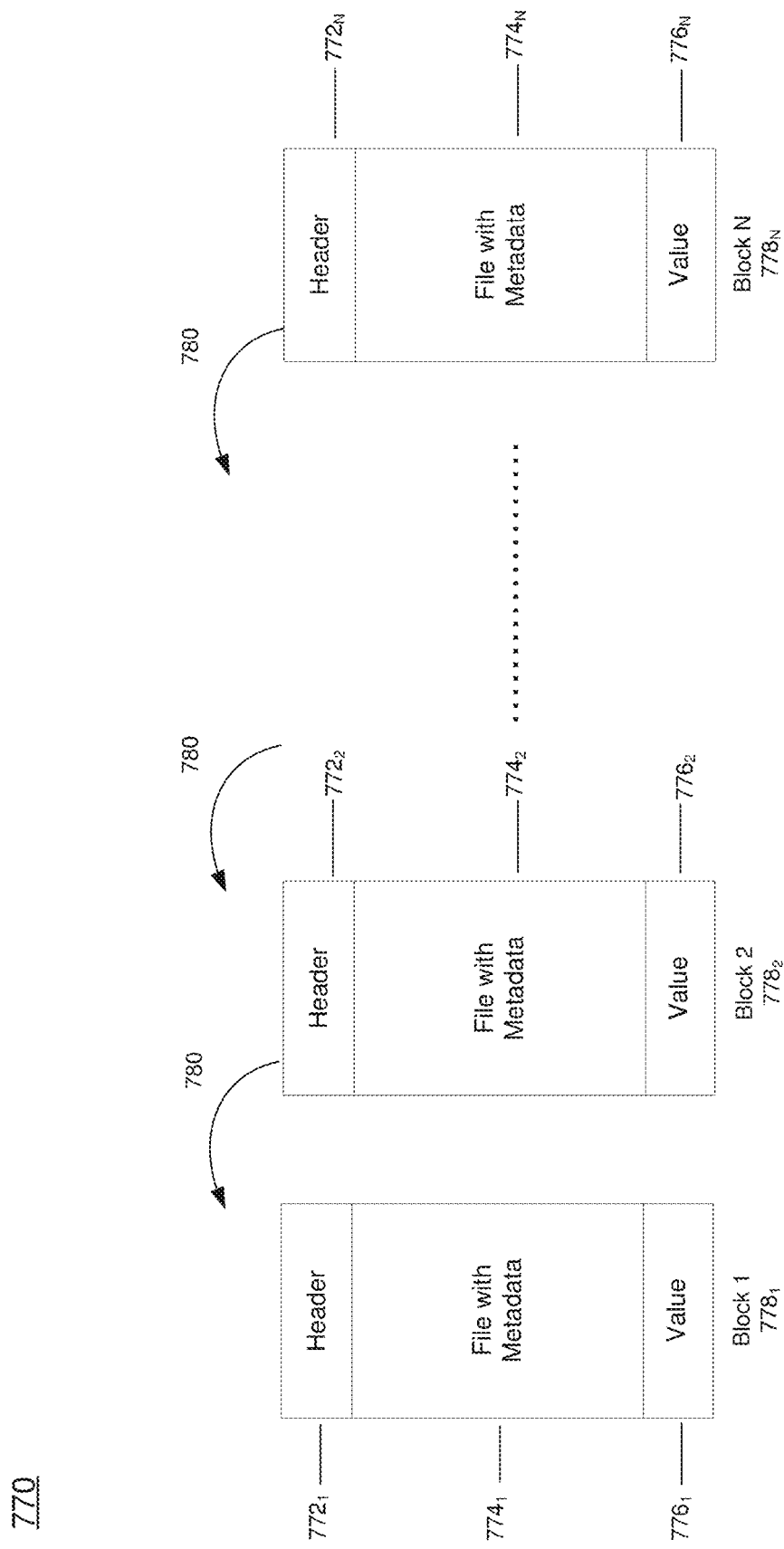
FIG. 7C is a diagram illustrating a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| Block N Hash Value | Block N Hash Value ... Content |

In the example embodiment of FIG. 7C, the blockchain 770 includes a number of blocks $778_1$, $778_2$, ... $778_N$ cryptographically linked in an ordered sequence, where $N \geq 1$. The encryption used to link the blocks $778_1$, $778_2$, ... $778_N$ may be any of a number of keyed or un-keyed Hash functions. In one embodiment, the blocks $778_1$, $778_2$, ... $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1$, $778_2$, ..., $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
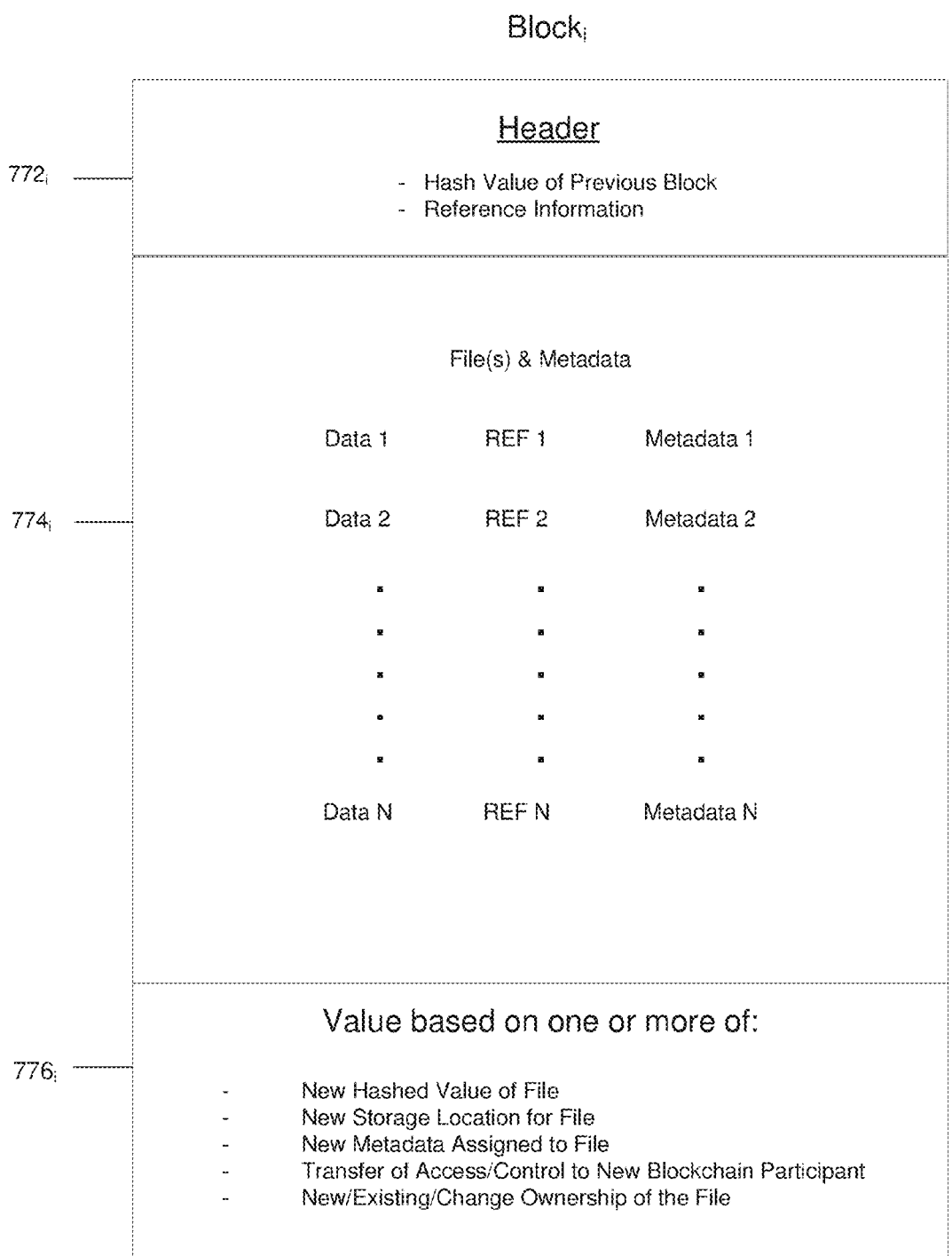
FIG. 7D is a diagram illustrating a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block Block$_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block Block$_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
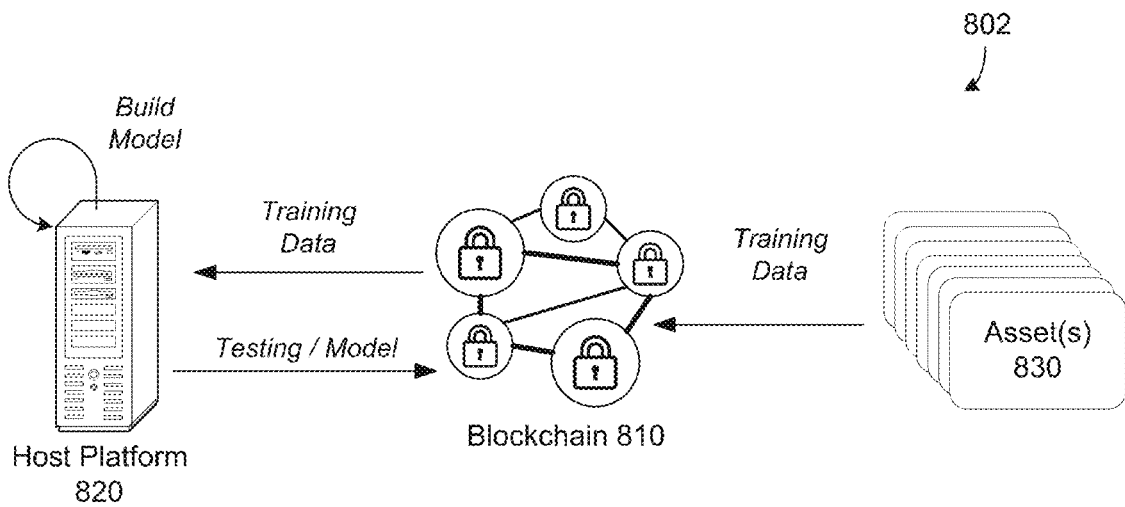
FIG. 8A is a diagram illustrating an example blockchain which stores machine learning (artificial intelligence) data, according to example embodiments.
Figure 8A:
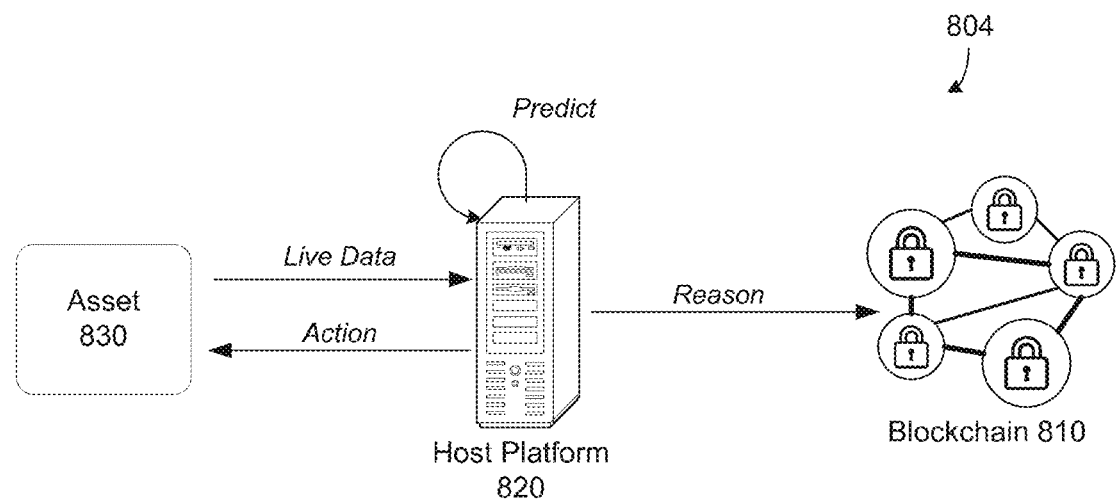
Figure 8B:
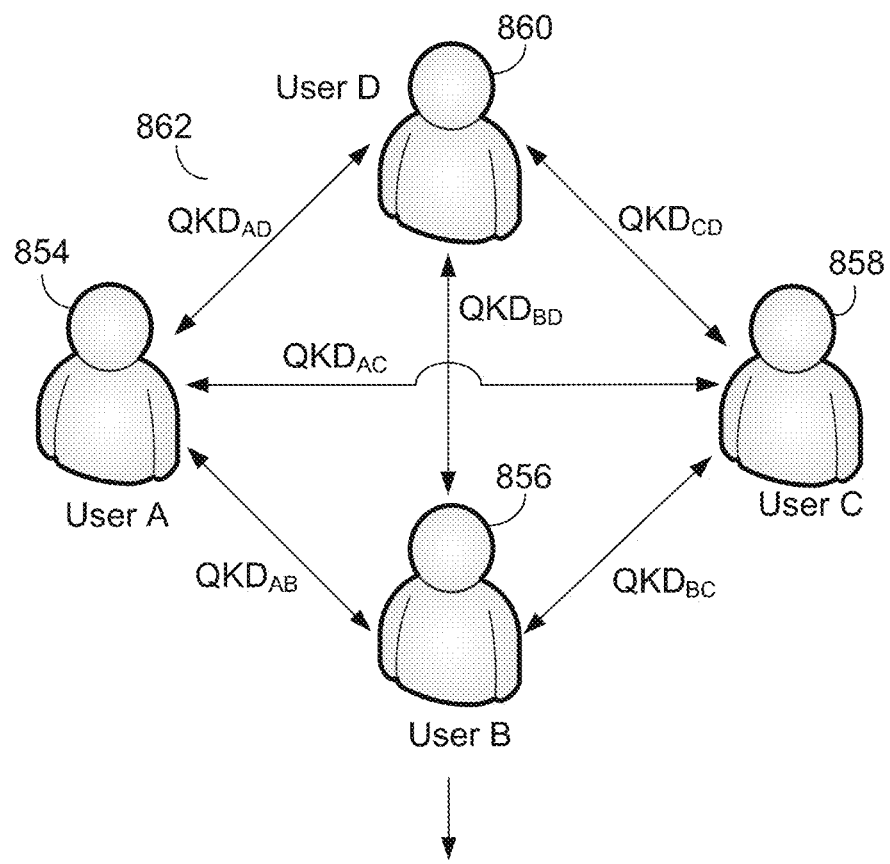
FIG. 8B is a diagram illustrating an example quantum-secure blockchain, according to example embodiments.
Figure 8B:
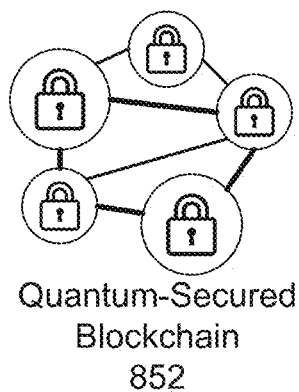

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
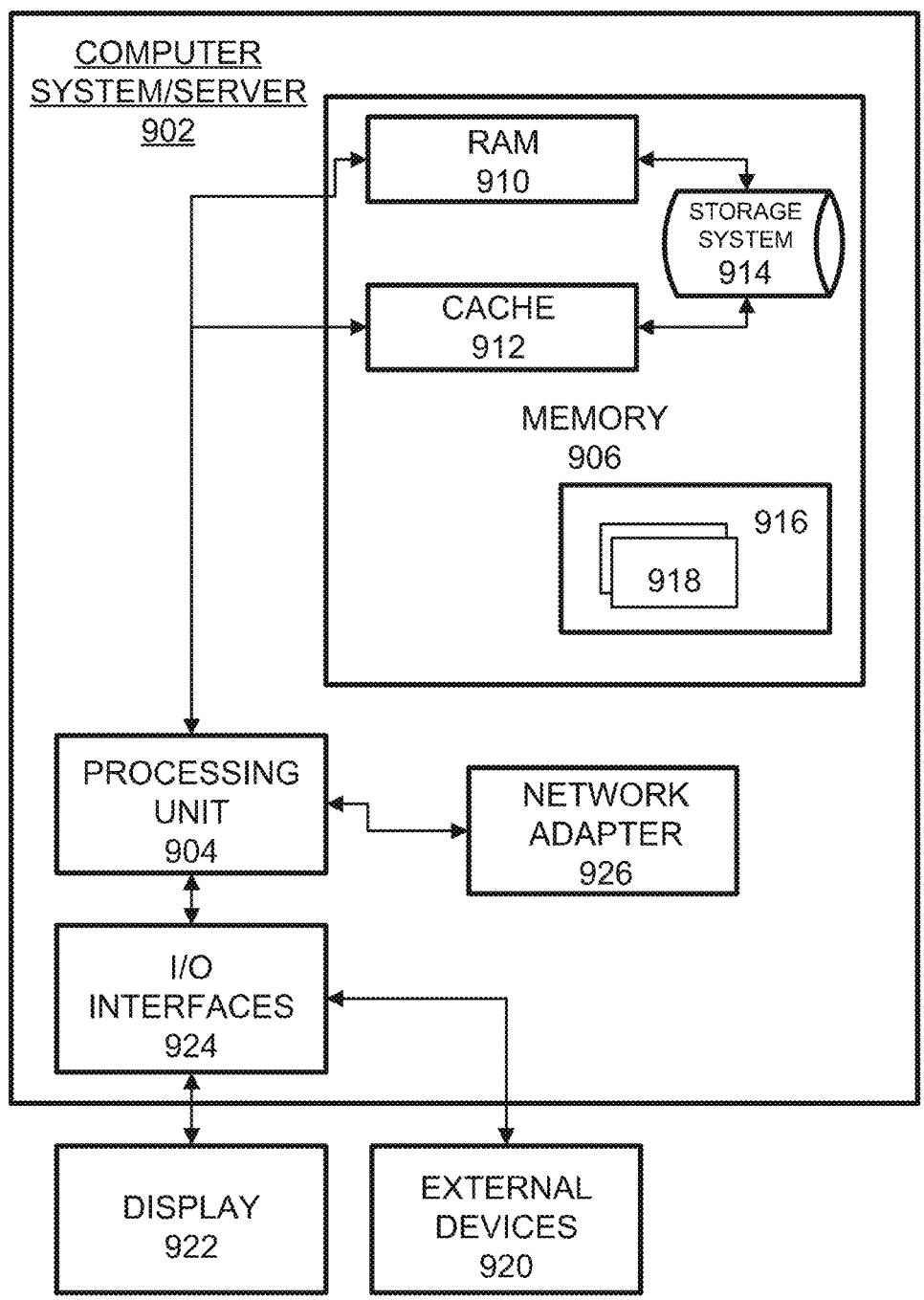
FIG. 9 is a diagram illustrating an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a network interface configured to transmit, from a client application, a proposed storage request to a plurality of endorser nodes of a blockchain; and
   a processor configured to receive, via the network interface, a first endorsement of the storage request from a first endorser node, where the first endorsement comprises a full-step hash verification of the proposed storage request, and receive a second endorsement of the storage request from a second endorser node, where the second endorsement comprises a reduced-step hash verification of the storage request,
   wherein the network interface is further configured to transmit full-step hash of the storage request signed by the client application and a reduced-step hash of the storage request signed by the client application to the plurality of endorser nodes.

2. The computing system of claim 1, wherein the processor is further configured to control the network interface to transmit a storage proposal that includes the full-step hash endorsement and the reduced-step hash endorsement to an orderer node of the blockchain.

3. The computing system of claim 1, wherein the full-step hash verification comprises a verification of the full-step hash signed by the client application and the reduced-step hash verification comprises an approximate verification of the reduced-step hash signed by the client application.

4. The computing system of claim 1, wherein a length of a data value created by the reduced-step hash of the proposed storage request is equal to a length of a data value created by the full-step hash of the proposed storage request.

5. The computing system of claim 1, wherein the full-step hash comprises repeated performance of a function on a data value of the proposed storage request a first predetermined number of times, and the reduced-step hash comprises repeated performance of the function on the data value of the proposed storage request a second predetermined number of times that is less than the first predetermined number of times.

6. The computing system of claim 1, wherein the second endorsement is received via a message which comprises a message element that indicates the message comprises the reduced-step hash verification.

7. The computing system of claim 1, wherein the proposed storage request comprises a blockchain entry to be stored in a data block among a hash-linked chain of data blocks.

8. A method comprising:
   transmitting, from a client application, a proposed storage request to a plurality of endorser nodes of a blockchain;
   receiving a first endorsement of the storage request from a first endorser node, the first endorsement comprising a full-step hash verification of the proposed storage request; and
   receiving a second endorsement of the storage request from a second endorser node, the second endorsement comprising a reduced-step hash verification of the storage request;
   wherein a full-step hash of the proposed storage request signed by the client application and a reduced-step hash of the storage request signed by the client application to the plurality of endorser nodes is transmitted.

9. The method of claim 8, wherein the transmitting further comprises transmitting a storage proposal including the full-step hash endorsement and the reduced-step hash endorsement to an ordering node of the blockchain.

10. The method of claim 8, wherein the full-step hash verification comprises a verification of the full-step hash of the proposed storage request signed by the client application and the reduced-step hash verification comprises an approximate verification of the reduced-step hash of the proposed storage request signed by the client application.

11. The method of claim 8, wherein a length of a data value created by the reduced-step hash of the proposed storage request is equal to a length of a data value created by the full-step hash of the proposed storage request.

12. The method of claim 8, wherein the full-step hash comprises repeated performance of a function on a data value of the proposed storage request a first predetermined number of times, and the reduced-step hash comprises repeated performance of the function on the data value of the proposed storage request a second predetermined number of times that is less than the first predetermined number of times.

13. The method of claim 8, wherein the second endorsement is received via a message which comprises a message element indicating the message comprises the reduced-step hash verification.

14. The method of claim 8, wherein the proposed storage request comprises a blockchain entry to be stored in a data block among a hash-linked chain of data blocks.

15. A non-transitory computer readable medium comprising instructions, that when read by a processor, cause the processor to perform a method comprising:
- transmitting, from a client application, a proposed storage request to a plurality of endorser nodes of a blockchain;
- receiving a first endorsement of the storage request from a first endorser node, the first endorsement comprising a full-step hash verification of the proposed storage request;
- receiving a second endorsement of the storage request from a second endorser node, the second endorsement comprising a reduced-step hash verification of the storage request; and
- a full-step hash of the proposed storage request signed by the client application and a reduced-step hash of the storage request signed by the client application to the plurality of endorser nodes is transmitted.

16. The non-transitory computer readable medium of claim 15, wherein the transmitting further comprises transmitting a storage proposal including the full-step hash endorsement and the reduced-step hash endorsement to an ordering node of the blockchain.

17. The non-transitory computer readable medium of claim 15, wherein the full-step hash verification comprises a verification of the full-step hash of the proposed storage request signed by the client application and the reduced-step hash verification comprises an approximate verification of the reduced-step hash of the proposed storage request signed by the client application.

18. The non-transitory computer readable medium of claim 15, wherein a length of a data value created by the reduced-step hash of the proposed storage request is equal to a length of a data value created by the full-step hash of the proposed storage request.

19. The non-transitory computer readable medium of claim 15, wherein the full-step hash comprises repeated performance of a function on a data value of the proposed storage request a first predetermined number of times, and the reduced-step hash comprises repeated performance of the function on the data value of the proposed storage request a second predetermined number of times that is less than the first predetermined number of times.

20. The non-transitory computer readable medium of claim 15, wherein the second endorsement is received via a message which comprises a message element indicating the message comprises the reduced-step hash verification.

* * * * *